(12) United States Patent
Naoi

(10) Patent No.: US 11,222,660 B2
(45) Date of Patent: Jan. 11, 2022

(54) MAGNETIC RECORDING MEDIUM FOR MICROWAVE-ASSISTED RECORDING, MAGNETIC RECORDING DEVICE, AND MANUFACTURING METHOD OF MAGNETIC RECORDING MEDIUM

(71) Applicant: FUJIFILM Corporation, Tokyo (JP)

(72) Inventor: Kenji Naoi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/739,987

(22) Filed: Jan. 10, 2020

(65) Prior Publication Data

US 2020/0227082 A1  Jul. 16, 2020

(30) Foreign Application Priority Data

Jan. 16, 2019 (JP) .............................. JP2019-005556

(51) Int. Cl.
  *G11B 5/706* (2006.01)
  *G11B 5/714* (2006.01)
  *G11B 5/00* (2006.01)

(52) U.S. Cl.
  CPC ...... *G11B 5/70615* (2013.01); *G11B 5/70678* (2013.01); *G11B 5/714* (2013.01); *G11B 2005/0024* (2013.01)

(58) Field of Classification Search
  None
  See application file for complete search history.

(56) References Cited

U.S. PATENT DOCUMENTS

| 5,689,384 A | 11/1997 | Albrecht et al. |
| 5,998,009 A * | 12/1999 | Kurihara ............... G11B 5/7013 |
| | | 428/323 |
| 8,027,110 B1 | 9/2011 | Yamanaka et al. |
| 8,947,984 B2 | 2/2015 | Hattori et al. |

(Continued)

FOREIGN PATENT DOCUMENTS

| CN | 103106904 A | 5/2013 |
| JP | 2-218013 A | 8/1990 |

(Continued)

OTHER PUBLICATIONS

Ikuya Tagawa et al., "Advantages of MAMR Read-Write Performance," Digests of The 26th Magnetic Recording Conference, TMRC 2015, University of Minnesota, Sponsored by the IEEE Magnetic Society, pp. 067-068 (167 pages total).

(Continued)

*Primary Examiner* — Kevin M Bernatz
(74) *Attorney, Agent, or Firm* — Sughrue Mion, PLLC

(57) ABSTRACT

A magnetic recording medium for microwave-assisted recording, including a non-magnetic support; and a magnetic layer containing a ferromagnetic powder and a binding agent, in which the ferromagnetic powder has an average particle size of 5 nm to 20 nm, and a coefficient of variation of a particle size distribution of 35% or lower, and the magnetic layer has a thickness of 25.0 nm to 100.0 nm, and a thickness variation of 1.0 nm to 12.0 nm. A magnetic recording device including a magnetic recording medium and a magnetic head for microwave-assisted recording. A manufacturing method of a magnetic recording medium having a servo pattern on a magnetic layer.

19 Claims, 1 Drawing Sheet

(56) References Cited

U.S. PATENT DOCUMENTS

| | | | |
|---|---|---|---|
| 10,115,425 B2* | 10/2018 | Shimizu | G11B 5/70 |
| 10,657,996 B2* | 5/2020 | Ozawa | G11B 5/584 |
| 2001/0033947 A1 | 10/2001 | Sasaki | |
| 2003/0170498 A1 | 9/2003 | Inoue | |
| 2003/0228492 A1 | 12/2003 | Ejiri et al. | |
| 2005/0089722 A1 | 4/2005 | Masaki | |
| 2005/0260458 A1* | 11/2005 | Hirai | G11B 5/584 |
| | | | 428/845.6 |
| 2006/0068196 A1 | 3/2006 | Suenaga et al. | |
| 2006/0083954 A1 | 4/2006 | Meguro et al. | |
| 2007/0253106 A1* | 11/2007 | Sato | G11B 5/3123 |
| | | | 360/125.02 |
| 2009/0080109 A1 | 3/2009 | Fukuzawa et al. | |
| 2010/0055504 A1 | 3/2010 | Omura | |
| 2010/0073804 A1 | 3/2010 | Ikeda et al. | |
| 2010/0208379 A1 | 8/2010 | Ikeda et al. | |
| 2011/0134561 A1 | 6/2011 | Smith et al. | |
| 2011/0242701 A1 | 10/2011 | Ohtake et al. | |
| 2012/0113540 A1 | 5/2012 | Zhang et al. | |
| 2012/0243117 A1 | 9/2012 | Aoyama et al. | |
| 2013/0070361 A1 | 3/2013 | Yang et al. | |
| 2013/0083423 A1 | 4/2013 | Shiroishi et al. | |
| 2013/0148242 A1 | 6/2013 | Koui et al. | |
| 2013/0170060 A1 | 7/2013 | Johns et al. | |
| 2013/0242430 A1 | 9/2013 | Aoyama et al. | |
| 2013/0258514 A1 | 10/2013 | Kobayashi et al. | |
| 2013/0258527 A1 | 10/2013 | Soeno et al. | |
| 2014/0340781 A1 | 11/2014 | Ajioka | |
| 2014/0340782 A1 | 11/2014 | Ajioka | |
| 2015/0170677 A1 | 6/2015 | Aoyama et al. | |
| 2015/0187380 A1 | 7/2015 | Shirata | |
| 2016/0005430 A1* | 1/2016 | Kawakami | G11B 5/70678 |
| | | | 428/840.1 |
| 2016/0163340 A1* | 6/2016 | Narita | G11B 5/314 |
| | | | 360/125.04 |
| 2016/0203894 A1* | 7/2016 | Shirata | G11B 5/714 |
| | | | 428/836.2 |
| 2017/0162220 A1* | 6/2017 | Nakashio | G11B 5/70621 |
| 2017/0316799 A1 | 11/2017 | Shimizu et al. | |
| 2018/0366152 A1 | 12/2018 | Naoi et al. | |
| 2019/0027182 A1 | 1/2019 | Ozawa | |
| 2019/0228889 A1 | 7/2019 | Yamaga et al. | |
| 2019/0259416 A1* | 8/2019 | Kawakami | G11B 5/70 |

FOREIGN PATENT DOCUMENTS

| | | |
|---|---|---|
| JP | 2001-283423 A | 10/2001 |
| JP | 2006-286098 A | 10/2006 |
| JP | 2013-140662 A | 7/2013 |
| JP | 2015-127985 A | 7/2015 |
| JP | 2017-199446 A | 11/2017 |
| WO | 2015/198514 A1 | 12/2015 |
| WO | 2017/094752 A1 | 6/2017 |
| WO | 2018/062478 A1 | 4/2018 |

OTHER PUBLICATIONS

Y. Nozaki et al., "Microwave-assisted magnetization reversal in 0.36-m-wide Permalloy wires," Applied Physics Letters, vol. 91, 2007, p. 122505-1-122505-3 (4 pages).

Rie Sato et al., "Simulations and Experiments Toward High-Data-Transfer-Rate Readers Composed of a Spin-Torque Oscillator," IEEE Transactions on Magnetics, vol. 48, No. 5, May 2012, pp. 1758-1764.

T. Yang et al., "Layer-resolved readout of magnetic signals using ferromagnetic resonance effect," Journal of Magnetism and Magnetic Materials, vol. 332, 2013, pp. 52-55.

Office Action dated Oct. 27, 2017 in U.S. Appl. No. 15/498,732.
Office Action dated Mar. 27, 2018 in U.S. Appl. No. 15/498,732.
Notice of Allowance dated Jul. 12, 2018 in U.S. Appl. No. 15/498,732.
Office Action dated Mar. 21, 2019 in U.S. Appl. No. 16/121,799.
Office Action dated Sep. 26, 2019 in U.S. Appl. No. 16/121,799.
Advisory Action dated Jan. 7, 2020 in U.S. Appl. No. 16/121,799.
Notice of Allowance dated Feb. 5, 2020 in U.S. Appl. No. 16/121,799.
U.S. Appl. No. 16/739,987 (the present application), Pending.
U.S. Appl. No. 16/121,799, Patented as U.S. Pat. No. 10,657,996.
U.S. Appl. No. 15/498,732, Patented as U.S. Pat. No. 10,115,425.
Communication dated Nov. 9, 2021, issued by the Japanese Patent Office in Japanese application No. 2019-005556.

* cited by examiner

MAGNETIC RECORDING MEDIUM FOR MICROWAVE-ASSISTED RECORDING, MAGNETIC RECORDING DEVICE, AND MANUFACTURING METHOD OF MAGNETIC RECORDING MEDIUM

CROSS-REFERENCE TO RELATED APPLICATIONS

This application claims priority under 35 U.S.C. 119 to Japanese Patent Application No. 2019-005556 filed on Jan. 16, 2019. The above application is hereby expressly incorporated by reference, in its entirety, into the present application.

BACKGROUND OF THE INVENTION

1. Field of the Invention

The present invention relates to a magnetic recording medium for microwave-assisted recording, a magnetic recording device, and a manufacturing method of a magnetic recording medium.

2. Description of the Related Art

High-density recording has been constantly required for a magnetic recording medium in accordance with an increase in information contents. In order to increase a recording density of data information, a decrease in a particle size of a ferromagnetic powder (hereinafter, referred to as "atomization") contained in a magnetic layer of the magnetic recording medium is effective. However, as atomization of the ferromagnetic powder proceeds, thermal stability of magnetization decreases, and retention of recording decreases due to so-called thermal fluctuation.

The point described above will be further described as follows. As an index for the thermal stability of magnetization, "KuV/kT" has been known. Ku indicates an anisotropy constant of the ferromagnetic powder, V indicates a particle volume, k indicates a Boltzmann's constant, and T indicates an absolute temperature. By increasing a magnetic energy KuV with respect to a thermal energy kT, that is, by increasing a value of "KuV/kT", it is possible to prevent an influence of the thermal fluctuation (that is, to improve the thermal stability of magnetization). However, it is necessary that the particle volume V is made to be small, for realizing high-density recording. The magnetic energy is the product of Ku and V, and accordingly, in order to increase the magnetic energy in a region having a small V, Ku need only be increased. However, in the ferromagnetic powder having a high Ku, since a switching magnetic field necessary for magnetization reversal increases, coercivity Hc is high, and accordingly, a strong external magnetic field is necessary for recording and writing easiness is decreased.

As described above, it is extremely difficult to satisfy three properties of the high-density recording, the thermal stability of magnetization, and the writing easiness. This problem is called trilemma of magnetic recording and is a major issue for proceeding higher-density recording.

The magnetic recording media are generally classified into metal thin film type magnetic recording media and coating type magnetic recording media. Examples of the magnetic recording device on which the metal thin film type magnetic recording media are mounted include a hard disk drive (HDD). Regarding the HDD, as means for solving the trilemma, a recording method of applying a microwave magnetic field from a magnetic head at the time of information recording to improve the writing easiness (microwave-assisted recording) has been proposed (refer to WO2017/094752, Ikuya Tagawa, Masato Shiimoto, Shuya Nosaki, Jun Aoyama and Yosuke Urakami, "Advantage of MAMR Read-Write Performance," The 26th Magnetic Recording Conference TMRC TMRC2015-D6, pp. 067-068, Y. Nozaki, K. Tateishi, S. Taharazako, M. Ohta, S. Yoshimura, and K. Matsuyama, Applied Physics Letters, 91, 122505 (2007); doi: 10.1063/1.2786593, Rie Sato, Kiwamu Kudo, Tazumi Nagasawa, Hirofumi Suto, and Koichi Mizushima, "Simulations and Experiments Toward High-Data-Transfer-Rate Readers Composed of a Spin-Torque Oscillator," IEEE Trans. Magn., vol. 48, no. 5, pp. 1758-1764 (2012), and T. Yang, H. Suto, T. Nagasawa, K. Kudo, K. Mizushima, R. Sato, "Journal of Magnetism and Magnetic Materials" 332 (2013), pp. 52-55).

On the other hand, in recent years, the possibility of the applying microwave-assisted recording to the coating type magnetic recording media has been studied (refer to, for example, a paragraph 0011 of WO2017/094752).

SUMMARY OF THE INVENTION

The metal thin film type magnetic recording medium is a magnetic recording medium including a magnetic layer of a metal thin film formed by vapor evaporation. On the other hand, the coating type magnetic recording medium is a magnetic recording medium including the magnetic layer containing the ferromagnetic powder together with a binding agent. The coating type magnetic recording medium is a useful magnetic recording medium as a data storage medium for storing a large content of information for a long period of time, because the coating type magnetic recording medium has excellent chemical durability as compared with the metal thin film type magnetic recording medium. Therefore, in order to overcome the trilemma and realize a large capacity data storage medium with higher density recording, it is desirable to provide the coating type magnetic recording medium superior in suitability for microwave-assisted recording (hereinafter, referred to as "microwave-assisted recording suitability").

One aspect of the present invention is to provide a coating type magnetic recording medium superior in microwave-assisted recording suitability.

One aspect of the present invention relates to a magnetic recording medium for microwave-assisted recording, including a non-magnetic support, and a magnetic layer containing a ferromagnetic powder and a binding agent, in which the ferromagnetic powder has an average particle size of 5 nm to 20 nm, and a coefficient of variation of a particle size distribution of 35% or lower, and the magnetic layer has a thickness of 25.0 nm to 100.0 nm, and a thickness variation of 1.0 nm to 12.0 nm.

One aspect of the present invention relates to a magnetic recording device including a magnetic recording medium, and a magnetic head for microwave-assisted recording, in which the magnetic recording medium has a non-magnetic support, and a magnetic layer containing a ferromagnetic powder and a binding agent, the ferromagnetic powder has an average particle size of 5 nm to 20 nm, and a coefficient of variation of a particle size distribution of 35% or lower, and the magnetic layer has a thickness of 25.0 nm to 100.0 nm, and a thickness variation of 1.0 nm to 12.0 nm.

One aspect of the present invention relates to a manufacturing method of a magnetic recording medium having a servo pattern on a magnetic layer, the method including forming a servo pattern on a magnetic layer of a magnetic recording medium by microwave-assisted recording, in which the magnetic recording medium has a non-magnetic support, and a magnetic layer containing a ferromagnetic powder and a binding agent, the ferromagnetic powder has an average particle size of 5 nm to 20 nm, and a coefficient of variation of a particle size distribution of 35% or lower, and the magnetic layer has a thickness of 25.0 nm to 100.0 nm, and a thickness variation of 1.0 nm to 12.0 nm.

In one aspect, the ferromagnetic powder may include a hexagonal strontium ferrite powder.

In one aspect, the ferromagnetic powder may include an ε-iron oxide powder.

In one aspect, the magnetic layer may exhibit a natural ferromagnetic resonance frequency of 30 GHz to 60 GHz.

In one aspect, a ten-point average roughness Rz of a surface of the magnetic layer may be 40 nm or less.

According to one aspect of the present invention, it is possible to improve writing easiness on a coating type magnetic recording medium by applying microwave-assisted recording.

DESCRIPTION OF THE PREFERRED EMBODIMENTS

Magnetic Recording Medium for Microwave-Assisted Recording

Figure 1:
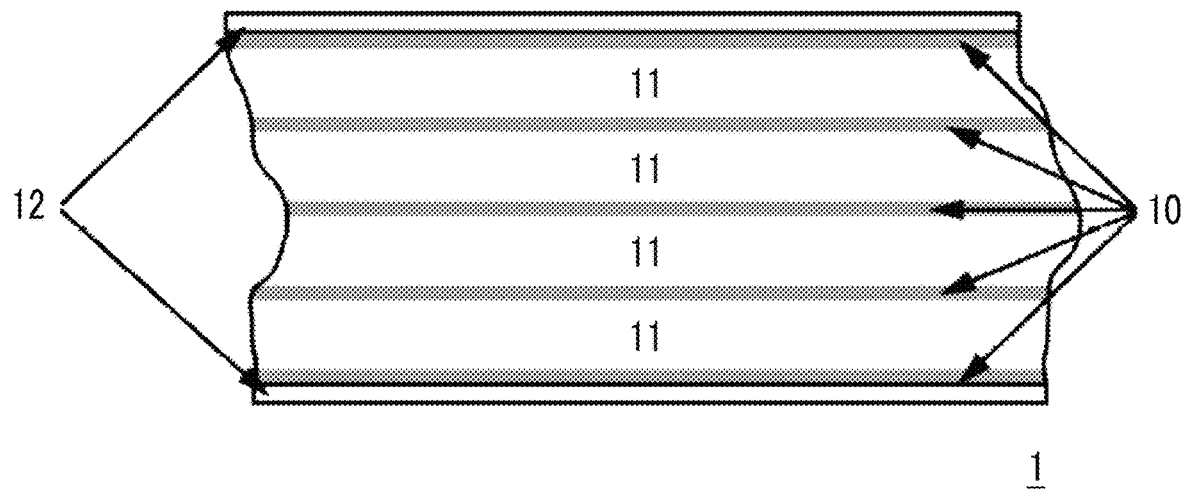
FIG. 1 shows an example of disposition of data bands and servo bands.

One aspect of the present invention relates to a magnetic recording medium for microwave-assisted recording (hereinafter, simply referred to as a "magnetic recording medium"), including a non-magnetic support; and a magnetic layer containing a ferromagnetic powder and a binding agent, in which the ferromagnetic powder has an average particle size of 5 nm to 20 nm, and a coefficient of variation of a particle size distribution of 35% or lower, and the magnetic layer has a thickness of 25.0 nm to 100.0 nm, and a thickness variation of 1.0 nm to 12.0 nm.

In the present invention and the present specification, the "microwave" is an electromagnetic wave having a frequency of 300 MHz to 300 GHz. The "microwave-assisted recording" is a recording system of applying a microwave magnetic field to the magnetic layer to assist magnetization reversal of the ferromagnetic powder and form a magnetization pattern. In the present invention and the present specification, the "magnetic recording medium for microwave-assisted recording" means a magnetic recording medium used for one or both of the applying of the microwave magnetic field to the magnetic layer to assist magnetization reversal of the ferromagnetic powder and record data information, and the applying of the microwave magnetic field to the magnetic layer to assist magnetization reversal of the ferromagnetic powder and form the servo pattern. Details of the data information and the servo pattern will be described below.

In the present invention and the present specification, values regarding magnetic properties of the magnetic layer and the ferromagnetic powder are values obtained at a measurement temperature of 23° C.±1° C., unless otherwise noted.

The magnetic recording medium for microwave-assisted recording has the average particle size and a coefficient of variation of the particle size distribution of the ferromagnetic powder contained in the magnetic layer, and the thickness and the thickness variation of the magnetic layer, within the above range. The present inventor considers that the above facts contribute to that magnetization reversal is easily assisted by applying the microwave magnetic field, that is, the improvement of the responsiveness to the application of the microwave magnetic field. It can be said that the higher the responsiveness to the application of the microwave magnetic field is, the better the microwave-assisted recording suitability is. Regarding the responsiveness to the application of the microwave magnetic field, it can be said that the shorter the microwave magnetic field applied to assist and cause magnetization reversal is, the higher the responsiveness is. It can be said that the narrower a width of a ferromagnetic resonance peak (for example, a half width) after magnetization reversal assisted by the application of the microwave magnetic field is, the higher the responsiveness is. Furthermore, it can be said that the stronger a peak intensity of a ferromagnetic resonance peak after magnetization reversal assisted by the application of the microwave magnetic field is, the higher the responsiveness is.

Hereinafter, the magnetic recording medium for microwave-assisted recording will be described in detail.

Magnetic Layer

Average Particle Size of Ferromagnetic Powder and Coefficient of Variation of Particle Size Distribution The magnetic recording medium for microwave-assisted recording is the coating type magnetic recording medium and includes the magnetic layer containing the ferromagnetic powder and the binding agent. The ferromagnetic powder contained in the magnetic layer has the average particle size of 5 nm to 20 nm, and the coefficient of variation of the particle size distribution of 35% or lower. It is assumed that the fact that the ferromagnetic powder contained in the magnetic layer has the average particle size and the coefficient of variation of the particle size distribution within the above range contributes to the improvement of the responsiveness to the application of the microwave magnetic field. From the viewpoint of further improving the responsiveness to the application of the microwave magnetic field, the average particle size is preferably 6 nm or more, more preferably 7 nm or more, still more preferably 8 nm or more, still more preferably 9 nm or more, and still more preferably 10 nm or more. From the same viewpoint, the average particle size is a preferably 19 nm or less, more preferably 18 nm or less, still more preferably 17 nm or less, still more preferably 16 nm or less, and still more preferably 15 nm or less. The coefficient of variation of the particle size distribution can be, for example, 4% or higher, 6% or higher, 8% or higher, 10% or higher, 12% or higher, 14% or higher, 16% or higher, 18% or higher, or 20% or higher. However, it is also possible to fall below the values described above. Also, from the viewpoint of further improving the responsiveness to the application of the microwave magnetic field, the coefficient of variation of the particle size distribution is preferably 33% or lower, more preferably 30% or lower, and still more preferably 28% or lower.

In the present invention and the present specification, the "average particle size" of various powders is a value measured by the following method by using a transmission electron microscope, unless otherwise noted.

The powder is imaged with the transmission electron microscope at a magnification ratio of 100,000 and printed on a printing paper so that the total magnification becomes 500,000, and an image of particles configuring the powder is obtained. Target particle is selected from the obtained image of the particles, an outline of the particle is traced with a digitizer, and the size of the particle (a primary particle) is measured. The primary particle is an independent particle which is not aggregated.

The above measurement is performed regarding randomly extracted 500 particles. An arithmetical mean of the particle sizes of the 500 particles obtained as described above is an average particle size (hereinafter, referred to as "D") of the powder.

The "coefficient of variation of the particle size distribution" of the ferromagnetic powder described above is obtained by multiplying the value, calculated by dividing the standard deviation σ of the particle size of 500 particles obtained as described above by the average particle size D, by 100. That is, it is obtained by the coefficient of variation (%) of the particle size distribution=(σ/D)×100.

As the transmission electron microscope, for example, a transmission electron microscope H-9000 manufactured by Hitachi, Ltd. can be used. In addition, the measurement of the particle size can be performed by using well-known image analysis software, for example, image analysis software KS-400 manufactured by Carl Zeiss. The average particle size described in Examples described below is a value measured by using the transmission electron microscope H-9000 manufactured by Hitachi, Ltd as the transmission electron microscope, and the image analysis software KS-400 manufactured by Carl Zeiss as the image analysis software, unless otherwise noted. In the present invention and the present specification, the powder refers to an aggregate of a plurality of particles. For example, the ferromagnetic powder means the aggregate of a plurality of the ferromagnetic particles. The aggregate of the plurality of particles is not limited to an aspect in which the particles constituting the aggregate are directly contact with each other, but also includes an aspect in which a binding agent or an additive which is described below is interposed between the particles.

As a method of collecting a sample powder from the magnetic recording medium in order to measure the particle size, a method disclosed in a paragraph 0015 of JP2011-048878A can be used, for example.

In the present invention and the present specification, the size of the particles (the particle size) constituting the powder is represented as follows:
(1) in a case where the shape of the particle observed in the particle photograph is a needle shape, a fusiform shape, or a columnar shape (note that, a height is greater than the maximum long diameter of a bottom surface), and the like, the particle size is represented by a length of the long axis constituting the particle, that is, the long axis length;
(2) in a case where the shape of the particle is a planar shape or a columnar shape (note that, a thickness or a height is smaller than the maximum long diameter of a plate surface or the bottom surface), the particle size is represented by the maximum long diameter of the plate surface or the bottom surface; and
(3) in a case where the shape of the particle is a sphere shape, a polyhedron shape, or an unspecified shape, and the long axis constituting the particles cannot be specified based on the shape, the particle size represented by an equivalent circle diameter, unless otherwise noted. The equivalent circle diameter is a value obtained by a circle projection method.

An average acicular ratio of the powders refers to an arithmetical mean obtained for 500 particles described above by measuring a short axis length of the particle. Here, in the definition of the particle size, the short axis length refers to a length of the short axis constituting the particle in the case of (1), a thickness or a height in the case of (2), and (a long axis length/a short axis length) is regarded as 1 for convenience in the case of (3), because there is no distinction between the long axis and the short axis, unless otherwise noted.

Unless otherwise noted, in a case where the shape of the particle is specific, for example, in the case of the definition (1) of the particle size, the average particle size is an average long axis length, and in the case of the definition (2), the average particle size is an average plate diameter. In the case of the definition (3), the average particle size is an average diameter (also referred to as an average particle diameter).

Thickness and Thickness Variation of Magnetic Layer

The magnetic layer of the magnetic recording medium for microwave-assisted recording has the thickness of 25.0 nm to 100.0 nm, and the thickness variation of 1.0 nm to 12.0 nm. It is assumed that the fact that the magnetic layer has the thickness and the thickness variation within the above range contributes to the improvement of the responsiveness to the application of the microwave magnetic field. From the viewpoint of further improving the responsiveness to the application of the microwave magnetic field, the thickness of the magnetic layer is preferably 30.0 nm or more, more preferably 35.0 nm or more, still more preferably 40.0 nm or more, and still more preferably 45.0 nm or more. From the same viewpoint, the thickness of the magnetic layer is preferably 95.0 nm or less, more preferably 90.0 nm or less, still more preferably 85.0 nm or less, still more preferably 80.0 nm or less, still more preferably 75.0 nm or less, still more preferably 70.0 nm or less, and still more preferably 65.0 nm or less. From the viewpoint of further improving the responsiveness to the application of the microwave magnetic field, the thickness variation of the magnetic layer is preferably 2.0 nm or more, more preferably 3.0 nm or more, still more preferably 4.0 nm or more, and still more preferably 5.0 nm or more. From the same viewpoint, the thickness variation of the magnetic layer is preferably 11.0 nm or less, more preferably 10.0 inn or less, and still more preferably 9.0 nm or less. The thickness of the magnetic layer can be adjusted, for example, by the amount of application of the composition for forming the magnetic layer. The thickness variation of the magnetic layer can be adjusted, for example, by the manufacturing conditions of the magnetic recording medium (for example, a calender processing condition).

The "thickness" of the magnetic layer is obtained by exposing a cross section of the magnetic recording medium in a thickness direction by the well-known method such as ion beam or microtome, performing the cross-sectional observation of the exposed cross section by using scanning transmission electron microscope (STEM), and determining the thickness values obtained for ten randomly selected locations as the arithmetical mean. Also, the "thickness variation" is obtained as "maximum value−minimum value" in the values obtained as described above. The thicknesses of the non-magnetic support and layers other than the magnetic layer can also be obtained in the same manner as described above. The description regarding the measurement method of the thickness of the magnetic layer in Examples can be referred to for the specific example of the measurement method of the thickness.

Natural Ferromagnetic Resonance Frequency

In one aspect, the magnetic layer of the magnetic recording medium for microwave-assisted recording can exhibit the natural ferromagnetic resonance frequency of 30 GHz or more. It is preferable that the magnetic layer exhibits the natural ferromagnetic resonance frequency of 30 GHz or more in order to cause magnetization reversal by assisting by applying the microwave magnetic field. In addition, the magnetic layer exhibiting the natural ferromagnetic resonance frequency of 30 GHz or more tends to be hardly affected by thermal fluctuation and has excellent thermal stability, and thus, it is preferable that the magnetic layer exhibits the natural ferromagnetic resonance frequency of 30 GHz or more, in order to improve retention of recording. The natural ferromagnetic resonance frequency exhibited by the magnetic layer is, for example, 35 GHz or more, or 38 GHz or more. The natural ferromagnetic resonance frequency of the magnetic layer can be, for example, 60 GHz or less, 55 GHz or less, or 50 GHz or less. However, the magnetic layer exhibiting higher natural ferromagnetic resonance frequency tends to have excellent retention of recording, and accordingly, the natural ferromagnetic resonance frequency of the magnetic layer may exceed the above-exampled values. In addition, the magnetic layer can also exhibit two or more different natural ferromagnetic resonance frequencies, and can also be a single magnetic layer exhibiting two or more different natural ferromagnetic resonance frequencies. As described below, from the viewpoint of enabling recording of two or more different information items to the single magnetic layer by the microwave-assisted recording (that is, multiple recording), it is preferable that the single magnetic layer exhibits two or more different natural ferromagnetic resonance frequencies. In a case where the single magnetic layer exhibits two or more different natural ferromagnetic resonance frequencies, at least one natural ferromagnetic resonance frequency can be 30 GHz or more, and two or more natural ferromagnetic resonance frequencies can be 30 GHz or more.

The ferromagnetic resonance is a phenomenon of a great precession of a magnetic moment (an electron spin) of a ferromagnetic material, by applying microwave magnetic field having equivalent natural frequency. In the present invention and the present specification, the "natural ferromagnetic resonance frequency" of the magnetic layer is an absorption peak frequency of the magnetic layer measured by vector network analyzer (VNA) in a case where magnetization of the magnetic layer is saturated by applying the external magnetic field equal to or greater than the saturation magnetic field to the magnetic layer in the same direction as the magnetization direction to be reversed, and then an application magnetic field is set as zero. The description regarding the directions in the present invention and the present specification such as the "same direction" includes a range of errors allowed in the technical field of the present invention. For example, in the errors, errors within approximately an angle of ±30° from an exact direction are allowed. The "magnetization direction" here is an average magnetization direction of magnetization directions of individual particles (ferromagnetic particles) of the ferromagnetic powder contained in the magnetic layer. For example, in a case where an alignment process is performed with respect to the magnetic layer in a case of manufacturing the magnetic recording medium, a direction of the magnetic field applied to the magnetic layer in the alignment process is generally an average magnetization direction of the magnetization directions of the individual particles. As the vector network analyzer, for example, a well-known vector network analyzer such as MS4647B or the like manufactured by Anritsu Corporation can be used. In addition, as a cable and/or a prober for connecting the magnetic layer and vector network analyzer at the time of the measuring, a cable and/or a prober configured with a member which is not affected by the magnetic field even in a case of being disposed in the magnetic field, that is, a non-magnetic member is used. Regarding the measurement method of the absorption peak frequency using the vector network analyzer, for example, the description in Y. Nozaki, K. Tateishi, S. Taharazako, M. Ohta, S. Yoshimura, and K. Matsuyama, Applied Physics Letters, 91, 122505(2007); doi:10.1063/1.2786593 can be referred to. In addition, the description of Examples which will be described below can be referred to. The natural ferromagnetic resonance frequency of the magnetic layer can be controlled with the coercivity Hc of the ferromagnetic powder contained in the magnetic layer. The magnetic layer containing ferromagnetic powder having higher coercivity Hc tends to exhibit a higher natural ferromagnetic resonance frequency. In addition, the magnetic layer exhibiting two or more different natural ferromagnetic resonance frequencies can be manufactured by using two or more kinds of ferromagnetic powder having different coercivity Hc. Details of the coercivity Hc of the ferromagnetic powder will be described below.

Ten-Point Average Roughness Rz

In one aspect, the ten-point average roughness Rz of the surface of the magnetic layer of the magnetic recording medium for microwave-assisted recording can be 45 nm or less. From the viewpoint of further improving the responsiveness to the application of the microwave magnetic field, the ten-point average roughness Rz of the surface of the magnetic layer is preferably 40 nm or less, more preferably 38 nm or less, still more preferably 35 nm or less, and still more preferably less than 35 nm. The ten-point average roughness Rz of the surface of the magnetic layer can be, for example, 10 nm or more, or 15 nm or more. The ten-point average roughness Rz of the surface of the magnetic layer can be adjusted, for example, by the manufacturing conditions of the magnetic recording medium (for example, a calender processing condition).

ten-point average roughness Rz of the surface of the magnetic layer is a value measured in an area of 40 μm×40 μm of the surface of the magnetic layer by using an atomic force microscope (AFM). As an example of the measurement conditions, the following measurement conditions can be used. In the present invention and the present specification, the "magnetic layer surface (the surface of the magnetic layer)" is synonymous with the magnetic layer side surface of the magnetic recording medium.

The area of 40 μm×40 μm of the surface of the magnetic layer of the magnetic recording medium is measured by using the AFM (Nanoscope 4 manufactured by Veeco Instruments Inc.) in a tapping mode. As a probe, RTESP-300 manufactured by BRUKER is used, and a scanning speed (a probe moving speed) is 40 μm/sec, and the resolution is 512 pixels×512 pixels.

Ferromagnetic Powder

As the ferromagnetic powder contained in the magnetic layer of the magnetic recording medium for microwave-assisted recording, a hexagonal ferrite powder and an ε-iron oxide powder can be exemplified. As the hexagonal ferrite powder, a hexagonal strontium ferrite powder is preferable. In general, the magnetic layer containing the hexagonal strontium ferrite powder as the ferromagnetic powder tends to be excellent in thermal stability of magnetization, but tends to have low writing easiness. On the other hand, the microwave-assisted recording is preferably applied to the magnetic recording medium which tends to have low writing easiness. Magnetization reversal can be assisted by applying the microwave magnetic field. From the above viewpoint, as the ferromagnetic powder contained in the magnetic layer of the magnetic recording medium for microwave-assisted recording, the hexagonal strontium ferrite powder is preferable. Also, from the same viewpoint, the ε-iron oxide powder is also, preferable. As the ferromagnetic powder contained in the magnetic layer, two or more different kinds of the ferromagnetic powder may be used in combination. For example, as the ferromagnetic powder contained in the magnetic layer, one of the hexagonal strontium ferrite powder or the ε-iron oxide powder may be used alone, and both thereof may be used in combination.

Hereinafter, details of the hexagonal ferrite powder and the ε-iron oxide powder will be described.

Hexagonal Ferrite Powder

In the present invention and the present specification, the "hexagonal ferrite powder" refers to the ferromagnetic powder in which a hexagonal ferrite type crystal structure can be detected as a main phase by X-ray diffraction analysis. The main phase refers to a structure to which the highest intensity diffraction peak in the X-ray diffraction spectrum obtained by the X-ray diffraction analysis belongs. For example, in a case where the highest intensity diffraction peak in the X-ray diffraction spectrum obtained by X-ray diffraction analysis belongs to the hexagonal ferrite type crystal structure, the hexagonal ferrite type crystal structure is determined to be detected as the main phase. In a case where only a single structure is detected by the X-ray diffraction analysis, the detected structure is set as the main phase. The hexagonal ferrite type crystal structure includes at least an iron atom, a divalent metal atom, or an oxygen atom as constituent atoms. The divalent metal atom is a metal atom which can be divalent cations as ions, and examples thereof include an alkali earth metal atom such as a strontium atom, a barium atom, and a calcium atom, and a lead atom. In the present invention and the present specification, the hexagonal strontium ferrite powder means that the main divalent metal atom contained in the powder is a strontium atom, and the hexagonal barium ferrite powder means that the main divalent metal atom contained in the powder is a barium atom. The main divalent metal atom refers to the divalent metal atom that accounts for the most on an atom % basis among the divalent metal atoms contained in the powder. However, a rare earth atom is not included in the divalent metal atom described above. The hexagonal ferrite powder may include a rare earth atom, or may not include a rare earth atom. The "rare earth atom" in the present invention and the present specification is selected from the group consisting of a scandium atom (Sc), a yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), a erbium atom (Er), a thulium atom (Tm), a ytterbium atom (Yb), and a lutetium atom (Lu). As described above, a hexagonal strontium ferrite powder is preferable as the hexagonal ferrite powder. Hereinafter, details of the hexagonal strontium ferrite powder will be described.

As a crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. The hexagonal strontium ferrite powder can be a powder in which the single crystal structure or two or more crystal structures are detected by X-ray diffraction analysis. For example, in one aspect, the hexagonal strontium ferrite powder can be a powder in which only M type crystal structure is detected by X-ray diffraction analysis. For example, the M type hexagonal ferrite is represented by a composition formula of $AFe_{12}O_{19}$. Here, A represents a divalent metal atom. In a case where the hexagonal strontium ferrite powder is the M type, only strontium atom (Sr) is present as A, or a strontium atom (Sr) accounts for the most on an atom % basis as described above in a case where a plurality of divalent metal atoms are included as A. The divalent metal atom content percentage in the hexagonal strontium ferrite powder is usually determined by the kinds of the crystal structure of the hexagonal ferrite, and is not particularly limited. The fact is similarly applied to the iron atom content percentage and the oxygen atom content percentage. The hexagonal strontium ferrite powder includes at least an iron atom, a strontium atom, or an oxygen atom, may or may not include atoms other than these atoms. For example, the hexagonal strontium ferrite powder can further include a rare earth atom, and may not include a rare earth atom. The magnetic properties such as the coercivity Hc of the hexagonal strontium ferrite powder can be, for example, controlled by the kinds and a compositional ratio of atoms configuring the crystal structure of the hexagonal ferrite.

As the manufacturing method of the hexagonal strontium ferrite powder, a glass crystallization method, a coprecipitation method, a reverse micelle method, a hydrothermal synthesis method, and the like are known. All of the manufacturing methods are well known. The manufacturing method of the hexagonal strontium ferrite powder capable of being used as the ferromagnetic powder in the magnetic layer is not limited.

In one aspect, the coercivity Hc of the hexagonal strontium ferrite powder is preferably 159 kA/m or more. The coercivity Hc of the hexagonal strontium ferrite powder is, for example, 20,000 kA/m or less. However, the coercivity Hc thereof may be more than 20,000 kA/m. In general, as the ferromagnetic powder has high coercivity Hc, the anisotropy constant Ku is high, and it is preferable from a viewpoint of thermal stability (retention of recording). The coercivity Hc of the ferromagnetic powder is obtained by using a well-known measurement device as a device for measuring the magnetic properties.

ε-Iron Oxide Powder

In the present invention and the present specification, the "ε-iron oxide powder" refers to the ferromagnetic powder in which an ε-iron oxide type crystal structure is detected by the X-ray diffraction analysis, as the main phase. For example, in a case where the highest intensity diffraction peak in the X-ray diffraction spectrum obtained by X-ray diffraction analysis belongs to the ε-iron oxide type crystal structure, the ε-iron oxide type crystal structure is determined to be detected as the main phase. A manufacturing method of the ε-iron oxide powder, a manufacturing method from a goethite, a reverse micelle method, and the like are known. All of the manufacturing methods are well known. Regarding the method of manufacturing the ε-iron oxide powder in which a part of Fe is substituted with substitutional atoms such as Ga, Co, Ti, Al, or Rh, the description disclosed in J. Jpn. Soc. Powder Metallurgy Vol. 61 Supplement, No. 51, pp. S280-S284, J. Mater. Chem. C, 2013, 1, pp. 5200-5206 can be referred to, for example. The magnetic properties such as the coercivity Hc of the ε-iron oxide powder can be, for example, controlled by the kinds and a compositional ratio of atoms configuring the crystal structure of the ε-iron oxide powder. However, the manufacturing method of the ε-iron oxide powder that can be used as the ferromagnetic powder of the magnetic layer is not limited to the method exemplified here.

In one aspect, the coercivity Hc of the ε-iron oxide powder is preferably 159 kA/m or more. The coercivity Hc of the ε-iron oxide powder can be, for example, 20,000 kA/m. However, the coercivity Hc thereof may be more than 20,000 kA/m.

In the ferromagnetic powders above, the average particle size and the coefficient of variation of the particle size distribution are adjusted by the manufacturing condition of the ferromagnetic powder or the like. As an example, in a case where a heating treatment is included in the manufacturing step of the ferromagnetic powder, as the time of the heating treatment becomes longer, the average particle size tends to be larger, and the coefficient of variation of the particle size distribution tends to be larger.

Details of the ferromagnetic powder contained in the magnetic layer of the magnetic recording medium for microwave-assisted recording are as described above. The content percentage (filling percentage) of the ferromagnetic powder in the magnetic layer is preferably 50% to 90% by mass, and more preferably 60% to 90% by mass. The components other than the ferromagnetic powder in the magnetic layer are at least a binding agent, and one or more additives can be further randomly contained. A high filling percentage of the ferromagnetic powder in the magnetic layer is preferable from a viewpoint of improving recording density.

Binding Agent, Curing Agent

The magnetic layer contains a binding agent together with the ferromagnetic powder. One or more resins are used as the binding agent. The resin may be a homopolymer or a copolymer. As the binding agent contained in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone, or a plurality of resins can be mixed with each other to be used. Among these, a polyurethane resin, an acrylic resin, a cellulose resin, and a vinyl chloride resin are preferable. These resins can also be used as the binding agent in the non-magnetic layer and/or a back coating layer which will be described below. For the binding agent described above, a description disclosed in paragraphs 0029 to 0031 of JP2010-024113A can be referred to. An average molecular weight of the resin used as the binding agent can be, for example, 10,000 to 200,000 as a weight-average molecular weight. The weight-average molecular weight in the present invention and the present specification refers to a value obtained by polystyrene conversion of a value measured by gel permeation chromatography (GPC). As the measurement conditions, the following conditions can be used. The weight-average molecular weight shown in Examples described below is a value obtained by polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mm ID (inner diameter)×30.0 cm)

Eluent: Tetrahydrofuran (THF)

The curing agent can also be used together with the resin that can be used as the binding agent. In one aspect, the curing agent can be a thermosetting compound which is a compound in which a curing reaction (crosslinking reaction) proceeds due to heating, and in another aspect, the curing agent can be a photocurable compound in which a curing reaction (crosslinking reaction) proceeds due to light irradiation. At least a part of the curing agent can be contained in the magnetic layer in a state of being reacted (crosslinked) with other components such as the binding agent, by the curing reaction proceeding in the magnetic layer forming step. In a case where the composition used to form the other layer contains the curing agent, the fact is similarly applied to the layer formed using the compositions. The preferred curing agent is the thermosetting compound, and polyisocyanate is suitable. For details of the polyisocyanate, descriptions disclosed in paragraphs 0124 and 0125 of JP2011-216149A can be referred to, for example. The content of the curing agent of the composition for forming the magnetic layer can be, for example, 0 to 80.0 parts by mass with respect to 100.0 parts by mass of the binding agent, and is preferably 50.0 to 80.0 parts by mass.

Additives

The magnetic layer contains the ferromagnetic powder and the binding agent, and may contain one or more additives as required. Examples of the additives include the above curing agent. In addition, examples of the additives contained in the magnetic layer contain the non-magnetic powder (for example, inorganic powders or carbon black), a lubricant, a dispersing agent, a dispersing assistant, an antibacterial agent, an antistatic agent, an antioxidant. For example, for lubricants, descriptions disclosed in paragraphs 0030 to 0033 and 0035 to 0036 of JP2016-126817A can be referred to. The lubricant may be contained in a non-magnetic layer described below. For the lubricant contained in the non-magnetic layer, descriptions disclosed in paragraphs 0030, 0031, and 0034 to 0036 of JP2016-126817A can be referred to. For the dispersing agent, descriptions disclosed in paragraphs 0061 and 0071 of JP2012-133837A can be referred to. The dispersing agent may be added to the composition for forming the non-magnetic layer. For the dispersing agent that can be added to the composition for forming the non-magnetic layer, the description disclosed in a paragraph 0061 of JP2012-133837A can be referred to. In addition, examples of the non-magnetic powder that can be contained in the magnetic layer contain the non-magnetic powder that can function as an abrasive, and the non-magnetic powder (for example, non-magnetic colloid particles) that can function as a protrusion forming agent that forms a protrusion that protrudes appropriately on the surface of the magnetic layer. As additives, a commercially available product can be suitably selected according to the desired properties or manufactured by a well-known method, and can be used with any amount.

Non-Magnetic Layer

In one aspect, the magnetic recording medium for microwave-assisted recording has the magnetic layer directly on the non-magnetic support. Also, in one aspect, the magnetic recording medium for microwave-assisted recording has the non-magnetic layer containing the non-magnetic powder and the binding agent, between the non-magnetic support and the magnetic layer.

The non-magnetic powder used in the non-magnetic layer may be a powder of an inorganic substance (the inorganic powder) or a powder of an organic substance (the organic powder). In addition, carbon black and the like can be used.

Examples of the inorganic substance include metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For the carbon black that can be used in the non-magnetic layer, descriptions disclosed in paragraphs 0040 to 0041 of JP2010-024113A can be referred to. The content (filling percentage) of the non-magnetic powder in the non-magnetic layer is preferably 50% to 90% by mass, and more preferably 60% to 90% by mass.

For other details of the binding agent and the additives of the non-magnetic layer, known techniques relating to the non-magnetic layer of the coating type magnetic recording medium can be applied. For the type and content of the binding agent, and the type and content of the additives, known techniques relating to the magnetic layer of the coating type magnetic recording medium can also be applied.

In the present invention and the present specification, the "non-magnetic layer" includes a substantially non-magnetic layer containing a small amount of the ferromagnetic powder as impurities or intentionally, together with the non-magnetic powder. Here, the "substantially non-magnetic layer" is a layer having a residual magnetic flux density of 10 mT or less, a layer having the coercivity of 7.96 kA/m (100 Oe) or less, or a layer that has a residual magnetic flux density of 10 mT or less and the coercivity of 7.96 kA/m (100 Oe) or less. It is preferable that the non-magnetic layer does not have the residual magnetic flux density and the coercivity.

Non-Magnetic Support

As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. These supports may be subjected to corona discharge, plasma treatment, easy-bonding treatment, or heat treatment, in advance.

Back Coating Layer

The magnetic recording medium for microwave-assisted recording may have or may not have a back coating layer including the non-magnetic powder and the binding agent, on the surface side opposite to the surface side of the non-magnetic support having the magnetic layer. The back coating layer preferably contains one or both of the carbon black and the inorganic powder. With respect to the binding agent contained in the back coating layer and various additives which may optionally be contained in the back coating layer, known techniques relating to the back coating layer of the coating type magnetic recording medium can be applied, and known techniques relating to the formulations of the magnetic layer of the coating type magnetic recording medium and/or the non-magnetic layer can also be applied. For example, for the back coating layer, the description disclosed in paragraphs 0018 to 0020 of JP2006-331625A and the description of column 4, line 65 to column 5, line 38 of U.S. Pat. No. 7,029,774A can be referred to.

Thicknesses of Non-Magnetic Support and Each Layer

The thickness of the non-magnetic support is, for example, 3.0 to 80.0 μm, preferably 3.0 to 20.0 μm, and more preferably 3.0 to 10.0 μm.

The thickness of the non-magnetic layer is, for example, 0.05 to 3.0 μm, preferably 0.1 to 2.0 μm, and more preferably 0.1 to 1.5 μm.

The thickness of the back coating layer is preferably 0.9 μm or less and more preferably 0.1 to 0.7 μm.

The thickness of the magnetic layer is as described above. In one aspect, the magnetic recording medium for microwave-assisted recording can be the magnetic recording medium including only one layer of the magnetic layer (that is, a single magnetic layer). In this case, the single magnetic layer may exhibit only one natural ferromagnetic resonance frequency, or two or more different natural ferromagnetic resonance frequencies. For example, by forming the magnetic layer by using ferromagnetic powder collected from two different kinds of ferromagnetic powder lots having different coercivity Hc, it is possible to obtain a coating type magnetic recording medium including a single magnetic layer exhibiting two natural ferromagnetic resonance frequencies. According to the microwave-assisted recording, it is possible to record two or more different information items (that is, multiple recording) on the single magnetic layer, by using the fact that the single magnetic layer exhibits two or more different natural ferromagnetic resonance frequencies. This point will be further described below. The "two or more different information items" are two or more information series independent from each other. The two or more information series independent from each other may be configured with only a plurality of different data information items, may be configured with only a plurality of different head tracking servo information items, or may be configured with one or more head tracking servo information items and one or more data information items. The data information is various information items such as character information or image information recorded on the magnetic layer of the magnetic recording medium. Meanwhile, the head tracking servo information is configured with the shape of the servo pattern for performing the head tracking servo and disposition of the plurality of servo patterns.

Hereinafter, a case where the single magnetic layer exhibits natural ferromagnetic resonance frequencies α and β (α≠β), and this single magnetic layer contains two kinds of ferromagnetic powders of the ferromagnetic powder in which magnetization reversal is assisted by applying a microwave magnetic field at a frequency A (hereinafter, also referred to as "ferromagnetic powder α"); and the ferromagnetic powder in which magnetization reversal is assisted by applying a microwave magnetic field at a frequency B (hereinafter, also referred to as "ferromagnetic powder β"), will be described as an example. The natural ferromagnetic resonance frequency α is derived from the ferromagnetic powder α, and the natural ferromagnetic resonance frequency β is derived from the ferromagnetic powder β. The ferromagnetic powder α and the ferromagnetic powder β are generally ferromagnetic powders collected from the ferromagnetic powder lots having different coercivity Hc. The microwave magnetic field is applied in a direction opposite to the magnetization direction before magnetization reversal, in order to assist magnetization reversal. A value of the frequency in the microwave magnetic field depends on a magnetic field strength of the microwave magnetic field, and as the magnetic field strength increases, the frequency decreases. The ferromagnetic powder α and the ferromagnetic powder β have different frequencies at which magnetization reversal is assisted. In order to assist magnetization reversal of the ferromagnetic powder α, a microwave magnetic field having a frequency which is preferably equal to or lower than the natural ferromagnetic resonance frequency α and more preferably lower than the natural ferromagnetic resonance frequency α, is applied. In order to assist magnetization reversal of the ferromagnetic powder β, a microwave magnetic field having a frequency which is preferably equal to or lower than the natural ferromagnetic resonance frequency β and more preferably lower than the natural ferromagnetic resonance frequency β, is applied. Accordingly, the frequency A is preferably equal to or less than the natural ferromagnetic resonance frequency α and more preferably lower than α. The frequency B is preferably equal to or less than the natural ferromagnetic resonance frequency β and more preferably lower than β. A≠B, and thus, magnetization reversal of the ferromagnetic powder β is not assisted by applying the microwave magnetic field of the frequency A, in order to assist magnetization reversal of the ferromagnetic powder α, and magnetization reversal of the ferromagnetic powder α is not assisted by applying the microwave magnetic field of the frequency B, in order to assist magnetization reversal of the ferromagnetic powder β.

By using the properties described above, two different information items (hereinafter, referred to as "information α" and "information β") can be recorded on the single magnetic layer. Specific description is as follows. In a case where a recording magnetic field corresponding to the "information α" is applied to the magnetic layer containing the ferromagnetic powder α and the ferromagnetic powder β, and the microwave magnetic field of the frequency A capable of assisting magnetization reversal of the ferromagnetic powder α is applied to assist magnetization reversal of the ferromagnetic powder α, and accordingly, magnetization reversal of the ferromagnetic powder α occurs, and the information α can be recorded in the ferromagnetic powder α. Here, since magnetization reversal of the ferromagnetic powder β is not assisted, the information α is not recorded in the ferromagnetic powder β. In contrast, in a case where a recording magnetic field corresponding to the "information β" is applied to the magnetic layer including the ferromagnetic powder α and the ferromagnetic powder β, and the microwave magnetic field of the frequency B capable of assisting magnetization reversal of the ferromagnetic powder β is applied to assist magnetization reversal of the ferromagnetic powder β, and accordingly, magnetization reversal of the ferromagnetic powder β occurs, and the information β can be recorded in the ferromagnetic powder β. Here, since magnetization reversal of the ferromagnetic powder α is not assisted, the information β is not recorded in the ferromagnetic powder α. Therefore, it is possible to perform multiple recording of two different information items on the single magnetic layer (same magnetic layer).

In the example described above, the example of performing multiple recording of two different information items has been described. However, the multiple-recorded information items are not limited to two information items and may be three information items, four information items, or five or more information items (for example, 5 to 10 information items). By performing microwave-assisted recording by applying the microwave magnetic field at different frequencies, it is possible to perform the multiple recording of information items on the single magnetic layer, the number of which is the same as the number of natural ferromagnetic resonance frequencies of this magnetic layer. With respect to this, in the metal thin film type magnetic recording medium, the single magnetic layer exhibiting two or more natural ferromagnetic resonance frequencies is hardly formed due to a manufacturing reason of formation of the magnetic layer by vapor evaporation and the like. Accordingly, in order to perform the multiple recording of two or more different information items on the same metal thin film type magnetic recording medium by the microwave-assisted recording, a multilayered magnetic layer having two or more layers exhibiting different natural ferromagnetic resonance frequencies is provided. In contrast, according to the coating type magnetic recording medium, multiple recording can be performed on the single magnetic layer by the microwave-assisted recording as described above. Accordingly, for example, different data information items can be multiple-recorded on the single magnetic layer. In addition, for example, different head tracking servo information items can be recorded on the same region of the single magnetic layer. In addition, for example, the servo patterns are formed in the same region or different regions of the single magnetic layer by the microwave-assisted recording, and data information can be recorded by the microwave-assisted recording.

However, an aspect in which the multilayered magnetic layer having two or more layers is provided is not excluded from the magnetic recording medium for microwave-assisted recording. In the magnetic recording medium for microwave-assisted recording, the magnetic layer need only be at least one layer, and may be separated into two or more layers having different magnetic properties. For example, in the magnetic recording medium for microwave-assisted recording according to one aspect of the present invention, the magnetic layer may be separated to two or more layers having different magnetic properties, and a configuration regarding a well-known multilayered magnetic layer of the coating type magnetic recording medium can be applied. Regarding the multilayered magnetic layer, the thickness of the magnetic layer is a total thickness of the plurality of magnetic layers, and the thickness variation is a thickness variation relating to the total thickness. The plurality of magnetic layers having different magnetic properties may exhibit different natural ferromagnetic resonance frequencies, and may exhibit the same natural ferromagnetic resonance frequency.

Manufacturing Step of Magnetic Recording Medium for Microwave-Assisted Recording A step of preparing compositions for forming the magnetic layer, the non-magnetic layer, or the back coating layer can generally include at least a kneading step, a dispersing step, and a mixing step provided as required before and after these steps. Each step may be divided into two or more stages. Various components may be added at an initial stage or in a middle stage of each step. In addition, each component may be separately added in two or more steps. In order to manufacture the magnetic recording medium for microwave-assisted recording, a well-known manufacturing technology of the coating type magnetic recording medium can be used in some or all of the steps. For example, in the kneading step, an open kneader, a continuous kneader, a pressure kneader, or a kneader having a strong kneading force such as an extruder is preferably used. For details of these kneading processes, descriptions disclosed in JP1989-106338A (JP-H01-106338A) and JP1989-79274A (JP-H01-79274A) can be referred to. In order to disperse the composition for forming each layer, glass beads can be used as dispersion beads. As the dispersion beads, zirconia beads, titania beads, and steel beads which are dispersion beads having high specific gravity are suitable. These dispersion beads can be used by optimizing a particle diameter (a bead diameter) and a filling percentage of these dispersion beads. As a disperser, a well-known disperser can be used. Each layer forming composition may be filtered by a well-known method before performing the coating step. The filtering can be performed by filter filtering, for example. As the filter used in the filtering, a filter having a hole diameter of 0.01 to 3 μm (for example, a filter made of glass fiber or a filter made of polypropylene) can be used, for example.

The magnetic layer can be formed, for example, by directly applying the composition for forming the magnetic layer on the non-magnetic support, or by sequentially or simultaneously applying the composition for forming the non-magnetic layer. In an aspect in which the alignment process is performed, the alignment process is performed with respect to a coating layer in an alignment zone, while the coating layer of the composition for forming the magnetic layer is in a wet state. For the alignment process, various known techniques including the description disclosed in paragraph 0052 of JP2010-024113A can be applied. For example, a vertical alignment process can be performed by a known method such as a method using a magnetically opposed magnet. In the alignment zone, a drying speed of the coating layer can be controlled by a temperature, the air volume and/or a conveyance speed in the alignment zone of the drying air. The coating layer may be pre-dried before being conveyed to the alignment zone. The back coating layer is formed by applying the composition for forming the back coating layer on the side opposite to the side having the magnetic layer of the non-magnetic support (or the side on which the magnetic layer is to be provided).

After applying the composition for forming each layer, at any stage, the calender processing can be performed in order to increase the surface smoothness of the magnetic recording medium. The stronger the calender processing conditions is, the smaller the value of the thickness variation of the magnetic layer is. Also, the stronger the calender processing condition is, the smaller the ten-point average roughness Rz of the magnetic layer surface. Examples of the calender processing condition include the type of calender roll, calendering pressure, calendering temperature (a surface temperature of the calender roll), or the number of calender processing. The calendering pressure can be, for example, 200 to 500 kN/m, preferably 250 to 350 kN/m. The calendering temperature can be, for example, 70 to 120° C., preferably 80 to 100° C. The number of the calender processing can be, for example, 1 to 8 times. In addition, as the roll having a hard surface is used as the calender roll, the magnetic layer surface tends to be smoothed.

For details of the manufacturing method of the magnetic recording medium, for example, descriptions disclosed in paragraphs 0051 to 0057 of JP2010-024113A can be referred to.

The shape of the magnetic recording medium for microwave-assisted recording is not limited. The magnetic recording medium for microwave-assisted recording may be a tape-shaped magnetic recording medium (a magnetic tape) or may be a disk-shaped magnetic recording medium (a magnetic disk). For example, the magnetic tape is generally accommodated in a magnetic tape cartridge, and is distributed and used. In a magnetic tape device for recording and/or reproducing the data information, the magnetic tape can form the servo pattern by the known method in order to enable perform the head tracking servo. For example, the formation of the servo pattern can be performed with respect to the direct current (DC) demagnetized magnetic layer. A direction of the demagnetization can be the longitudinal direction or the vertical direction of the magnetic tape. A direction of the magnetization in a case of forming the servo pattern (that is, a magnetized region) can be the longitudinal direction or the vertical direction of the magnetic tape. In one aspect, the microwave-assisted recording can be used to form the servo pattern.

In one aspect, the magnetic recording medium for microwave-assisted recording can be used in a contact sliding type magnetic recording and reproducing system in which the magnetic layer surface and the magnetic head come into contact with each other and slide in a case of recording and/or reproducing the data information. Also, in one aspect, the magnetic recording medium for microwave-assisted recording may have a configuration not having a sliding part with the magnetic head, and may be used in a non-contact type magnetic recording and reproducing system in which the magnetic layer surface and the magnetic head do not come into contact with each other in a case of recording and/or reproducing the data information. For example, the magnetic recording medium for microwave-assisted recording may have a configuration in which the waveguide and the magnetic layer are integrally formed on the non-magnetic support (for example, a silicon substrate).

Magnetic Recording Device

One aspect of the present invention relates to a magnetic recording device including a magnetic recording medium, and a magnetic head for microwave-assisted recording, in which the magnetic recording medium has a non-magnetic support, and a magnetic layer containing a ferromagnetic powder and a binding agent, the ferromagnetic powder has an average particle size of 5 nm to 20 nm, and a coefficient of variation of a particle size distribution of 35% or lower, and the magnetic layer has a thickness of 25.0 nm to 100.0 nm, and a thickness variation of 1.0 nm to 12.0 nm.

Hereinafter, the magnetic recording device will be described in more detail.

Magnetic Recording Medium

The magnetic recording medium included in the magnetic recording device includes a non-magnetic support, and a magnetic layer containing a ferromagnetic powder and a binding agent, in which the ferromagnetic powder has an average particle size of 5 nm to 20 nm, and a coefficient of variation of a particle size distribution of 35% or lower, and the magnetic layer has a thickness of 25.0 nm to 100.0 nm, and a thickness variation of 1.0 nm to 12.0 nm. The magnetic recording medium included in the magnetic recording device is the magnetic recording medium for microwave-assisted recording according to one aspect of the present invention. The details are as described above. According to the magnetic recording device, data information can be recorded on the magnetic recording medium for microwave-assisted recording according to one aspect of the present invention which is the coating type magnetic recording medium, by the microwave-assisted recording.

Magnetic Head for Microwave-Assisted Recording

The magnetic head for microwave-assisted recording included in the magnetic recording device is not particularly limited as long as it can perform the microwave-assisted recording. According to the microwave-assisted recording, in a case of applying a recording magnetic field corresponding to the information to be recorded to the magnetic layer, magnetization reversal of the ferromagnetic powder, which does not perform magnetization reversal by applying of the recording magnetic field, is assisted by applying a microwave magnetic field, and thus magnetization reversal of the ferromagnetic powder occurs, and information can be recorded. Such an assist of magnetization reversal can be realized by setting the ferromagnetic powder included in the magnetic layer in a magnetic resonance state. In order for that, it is preferable to apply the microwave magnetic field at the frequency same as or the frequency in the vicinity of the natural ferromagnetic resonance frequency of the magnetic layer to the magnetic layer. In a case where the natural ferromagnetic resonance frequency of the magnetic layer is set as "X" GHz, it is more preferable to apply the microwave magnetic field at a frequency of (X−15.0) GHz to X GHz, and it is even more preferable to apply the microwave magnetic field at a frequency of (X−15.0) GHz or higher and lower than X GHz. In addition, in a case where the single magnetic layer exhibits two or more different natural ferromagnetic resonance frequencies, the different natural ferromagnetic resonance frequencies are preferably different from each other by 5.0 GHz or more (for example, 5.0 GHz to 10.0 GHz), from a viewpoint of performing multiple recording described above in an excellent manner.

The magnetic head for microwave-assisted recording includes at least a recording unit and can also include a recording unit and a reproducing unit. The recording unit can include a recording magnetic pole and a counter magnetic pole generating the recording magnetic field, and can further have a configuration including a microwave oscillation element generating the microwave magnetic field. The microwave magnetic field is preferably generated as an alternating magnetic field by the direct current, and a frequency of the alternating magnetic field is proportional to a current value of the direct current. Accordingly, it is possible to control the frequency of the microwave magnetic field applied to the magnetic layer, by adjusting the current value of the direct current. As the microwave oscillation element, the microwave oscillation element applying a static magnetic field may be used. Alternatively, dynamic recording may be performed by using a spin torque oscillator. One or two or more microwave oscillation elements may be included in the recording unit. In a case of applying the microwave magnetic field at two or more different frequencies to the magnetic layer by the magnetic head for microwave-assisted recording, the applying of the microwave magnetic field having different frequencies may be performed at the same time or sequentially, and is preferably sequentially performed. In addition, the reproducing of the recorded data information can be performed by measuring an absorption peak frequency. Alternatively, an element capable of performing magnetic field detection, for example, a hall element, a magnetoresistive (MR) element, a giant-magnetoresistive (GMR) element, or a tunnel-magnetoresistive (TMR) element can also be used as the reproducing unit. In addition, in order to reproduce the data information which is multiple-recorded, for example, the reproducing unit using the spin torque oscillator can also be used. For the reproducing of the data information using the spin torque oscillator, descriptions disclosed in Rie Sato, Kiwamu Kudo, Tazumi Nagasawa, Hirofumi Suto, and Koichi Mizushima, "Simulations and Experiments Toward High-Data-Transfer-Rate Readers Composed of a Spin-Torque Oscillator," IEEE Trans. Magn., vol. 48, no. 5, pp. 1758-1764 (2012) can be referred to, for example.

In regards to the reproducing of the data information which is multiple-recorded, a method of reproducing information recorded on a multilayered film having different absorption peak frequencies is disclosed in T. Yang, H. Suto, T. Nagasawa, K. Kudo, K. Mizushima, R. Sato, "Journal of Magnetism and Magnetic Materials" 332 (2013), pp. 52-55. Such a reproducing method can also be used for reading of the servo pattern which is multiple-recorded on the magnetic recording medium containing the different ferromagnetic powders in the same single magnetic layer.

The magnetic head included in the magnetic recording device that performs general recording of the data information without using the microwave-assisted recording can comprise a recording element for recording the data information, and can also comprise a reproducing element for reproducing the data information, in the same magnetic head as or the different magnetic head from the magnetic head comprising the recording element. In addition, a servo pattern reading element can be included in the same magnetic head as or the different magnetic head from the magnetic head comprising the recording element and/or the reproducing element.

In one aspect, for example, the spin torque oscillator can be incorporated into the magnetic head comprising the recording element for performing the general recording of the data information. According to such a magnetic head, it is possible to cause magnetization reversal (that is, to record the data information) by assisting magnetization reversal by applying the microwave magnetic field by the spin torque oscillator in a case where the recording magnetic field corresponding to information to be recorded is applied by the recording element. Accordingly, the microwave-assisted recording can be performed on the magnetic tape while running the magnetic tape in the magnetic recording device in the same manner as the general recording of the data information. Such microwave-assisted recording can be applied to the formation of the servo pattern.

As the recording system of magnetic recording, perpendicular recording and longitudinal recording are exemplified for the recording of the data information to the magnetic tape. In a case where the ferromagnetic powder contained in the magnetic layer is the hexagonal ferrite powder, it is preferable to set an easy-magnetization axis in a direction perpendicular to the surface of the magnetic layer, from a viewpoint of reducing an effect of demagnetization caused by a diamagnetic field. Accordingly, it is preferable to perform the perpendicular recording. In contrast, in a case where the ferromagnetic powder contained in the magnetic layer is the ε-iron oxide powder, it is preferable to set an easy-magnetization axis in a direction perpendicular to the surface of the magnetic layer, and it is also preferable to set the easy-magnetization axis in a longitudinal direction to the surface of the magnetic layer. It is because, the ε-iron oxide powder has comparatively small magnetization and comparatively great coercivity, compared to those of the hexagonal ferrite powder, and thus, it is hardly affected by the demagnetization due to the diamagnetic field. The longitudinal recording tends to be useful for improving output. The above description is also applied to the formation and the reading of the servo pattern.

Manufacturing Method of Magnetic Recording Medium Having Servo Pattern on Magnetic Layer One aspect of the present invention relates to the manufacturing method of the magnetic recording medium having the servo pattern in the magnetic layer, the method including forming the servo pattern by microwave-assisted recording on the magnetic layer of the magnetic recording medium. The magnetic recording medium on which the servo pattern is formed on the magnetic layer by such a manufacturing method includes the non-magnetic support, and the magnetic layer containing the ferromagnetic powder and the binding agent, in which the ferromagnetic powder has the average particle size of 5 nm to 20 nm, and the coefficient of variation of the particle size distribution of 35% or lower, and the magnetic layer has the thickness of 25.0 nm to 100.0 nm, and the thickness variation of 1.0 nm to 12.0 nm. For details of the magnetic recording medium in which the servo pattern is formed on the magnetic layer, the descriptions regarding the magnetic recording medium for microwave-assisted recording can be referred to.

In the magnetic recording medium, the data information is normally recorded on a data band of the magnetic recording medium. Accordingly, data tracks are formed in the data band. As means for realizing high capacity of the magnetic recording medium, a technology of disposing a larger amount of data tracks on the magnetic layer of the magnetic recording medium by narrowing the width of the data track, to increase recording density is used. However, in a case where the width of the data track is narrowed and the recording and/or reproducing of the data information is performed by conveying the magnetic recording medium in a drive, it is difficult that the magnetic head correctly follows the data tracks in accordance with the position change of the magnetic recording medium, and errors may easily occur at the time of recording and/or reproducing. Thus, as means for preventing the occurrence of such errors, a technology of forming the servo pattern on the magnetic layer and performing head tracking servo has been recently proposed and practically used.

In magnetic servo type head tracking servo of head tracking servo, the servo pattern is formed on the magnetic layer of the magnetic recording medium, and this servo pattern is read by a servo head to perform head tracking servo. The head tracking servo refers to controlling a position of the magnetic head in the drive. More specifically, the head tracking servo is performed as follows.

First, the servo head reads the servo pattern formed in the magnetic layer (that is, reproduces a servo signal). The position of the magnetic head in the drive is controlled in accordance with a value obtained by reading the servo pattern. Accordingly, in a case of conveying the magnetic recording medium in the drive for recording and/or reproducing the data information, it is possible to increase an accuracy of the magnetic head following the data track even in a case where the position of the magnetic recording medium is changed. For example, in a case of recording and/or reproducing the data information by conveying the tape-shaped magnetic recording medium (that is, the magnetic tape) in the drive, it is possible to control the position of the magnetic head in a width direction of the magnetic tape in the drive by performing the head tracking servo, even in a case where the position of the magnetic tape is changed in the width direction with respect to the magnetic head. Therefore, it is possible to correctly record the data information on the magnetic tape and/or correctly reproduce the data information recorded on the magnetic tape in the drive.

The servo pattern is formed by magnetizing a specific position of the magnetic layer, in the same manner as in the recording of the data information on the magnetic layer. Accordingly, in the same manner as the data information recording, the decrease in writing easiness can also occur in the formation of the servo pattern (the recording of the servo signal). That is, in a case where the strong external magnetic field is necessary for recording the data information, the strong external magnetic field is also necessary for forming the servo pattern, and thus, the writing easiness of the servo pattern also decreases. For example, in such a case, it is preferable to use the microwave-assisted recording for forming the servo pattern.

The servo pattern is formed on the magnetic layer by magnetizing a specific position of the magnetic layer by a servo pattern recording head (referred to as a "servo write head"). In a case of applying the recording magnetic field corresponding to head tracking servo information which should be recorded on the magnetic layer to the magnetic layer, by using the head capable of performing microwave-assisted recording as this servo write head, magnetization reversal of the ferromagnetic powder, which does not perform magnetization reversal by applying of the recording magnetic field, is assisted by applying a microwave magnetic field, and thus, magnetization reversal of the ferromagnetic powder occurs, and the servo pattern can be formed. Such an assist of magnetization reversal can be realized by setting the ferromagnetic powder included in the magnetic layer in a magnetic resonance state. In order for that, it is preferable to apply the microwave magnetic field at the frequency same as or the frequency in the vicinity of the natural ferromagnetic resonance frequency of the magnetic layer to the magnetic layer. For the relationship between the frequency of the microwave magnetic field to be applied and the natural ferromagnetic resonance frequency of the magnetic layer, the above description can be referred to.

The formation of the servo pattern can be performed with respect to the direct current (DC) demagnetized magnetic layer. A direction of the demagnetization can be the longitudinal direction or the vertical direction of the magnetic tape. A direction of the magnetization in a case of forming the servo pattern (that is, a magnetized region) can be the longitudinal direction or the vertical direction of the magnetic tape. The servo write head capable of performing the microwave-assisted recording includes at least a servo pattern forming unit (the recording unit). The servo pattern forming unit can include the recording magnetic pole and the counter magnetic pole generating the recording magnetic field, and can further have a configuration including the microwave oscillation element generating the microwave magnetic field. For details of the servo write head capable of performing microwave-assisted recording, the above description regarding the magnetic head for microwave-assisted recording can be referred to. In addition, the reading of the servo pattern formed on the magnetic layer can be performed by, for example, measuring the absorption peak frequency. Alternatively, an element capable of performing magnetic field detection similar to the various elements described above can also be used as the reproducing unit. In addition, in order to read the servo pattern which is multiple-recorded as described above, for example, the reading unit using the spin torque oscillator can also be used. For the reading of the servo pattern using the spin torque oscillator, the description disclosed in Rie Sato, Kiwamu Kudo, Tazumi Nagasawa, Hirofumi Suto, and Koichi Mizushima, "Simulations and Experiments Toward High-Data-Transfer-Rate Readers Composed of a Spin-Torque Oscillator," IEEE Trans. Magn., vol. 48, no. 5, pp. 1758-1764 (2012) can be referred to.

The shape and the disposition of the servo pattern for enabling the head tracking servo in the magnetic layer are well-known, and well-known technique can be applied to the shape of the servo pattern formed on the magnetic layer of the magnetic recording medium and the disposition thereof. For example, as a head tracking servo system, a timing-based servo system and an amplitude-based servo system are known. The servo pattern of the magnetic layer of the magnetic tape may be a servo pattern capable of allowing the head tracking servo of any system. In addition, the servo pattern capable of allowing head tracking servo in the timing-based servo system and the servo pattern capable of allowing head tracking servo in the amplitude-based servo system may be formed in the magnetic layer.

Hereinafter, as one specific aspect of the head tracking servo, the head tracking servo in the timing-based servo system will be described. However, the head tracking servo performed in the magnetic recording medium manufactured by the manufacturing method of the magnetic recording medium according to one aspect of the present invention is not limited to the following specific aspect.

In the head tracking servo in the timing-based servo system (hereinafter, referred to as a "timing-based servo"), a plurality of servo patterns having two or more different shapes are formed on the magnetic layer, and the position of the servo head is recognized by an interval of time in a case where the servo head has read two servo patterns having different shapes and an interval of time in a case where the servo head has read two servo patterns having the same shapes. The position of the magnetic head in the width direction of the magnetic tape is controlled based on the position of the servo head recognized as described above. Here, the magnetic head whose position is controlled is a magnetic head (a reproducing head) which reproduces data information recorded on the magnetic tape in one aspect, and the magnetic head is a magnetic head (a recording head) which records data information in the magnetic tape in another aspect.

Figure 2:
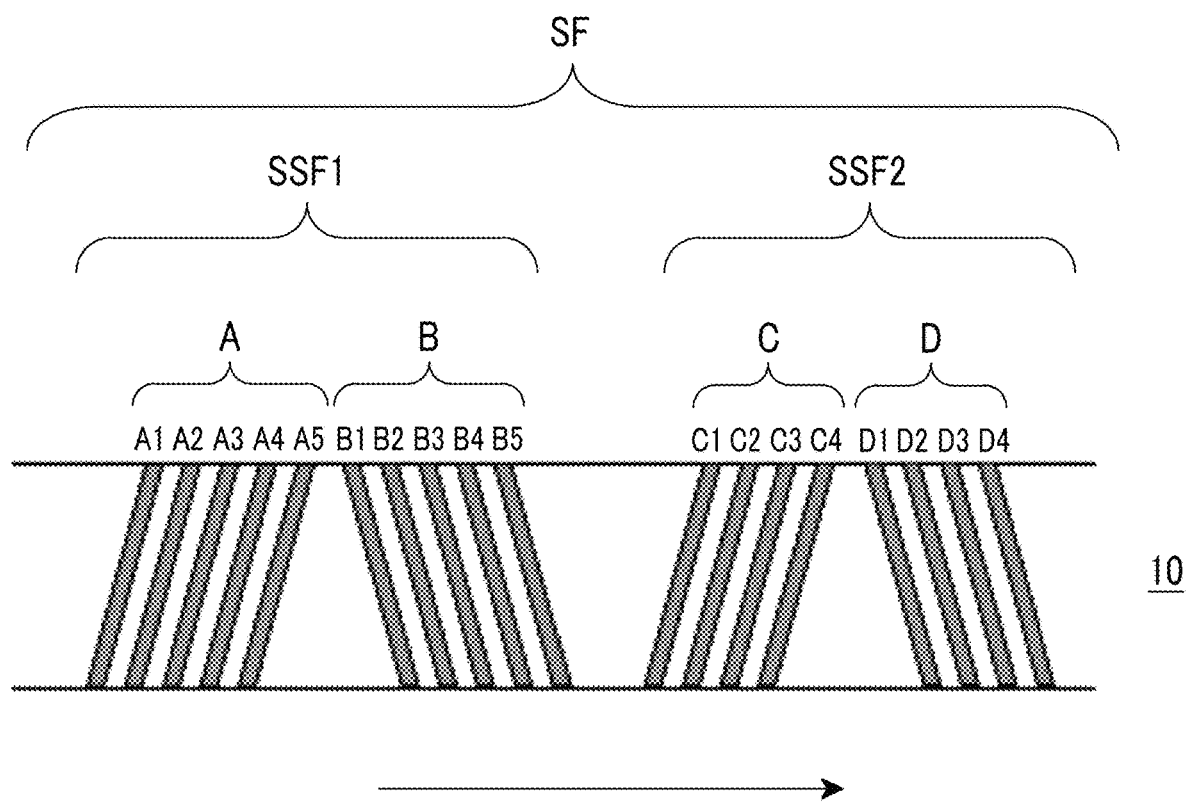
FIG. 2 shows a servo pattern disposition example of a linear-tape-open (LTO) Ultrium format tape.

FIG. 1 shows an example of disposition of data bands and servo bands. FIG. 2 shows a servo pattern disposition example of a linear-tape-open (LTO) Ultrium format tape. In FIG. 1, a plurality of servo bands 10 are disposed to be interposed between guide bands 12 in the magnetic layer of the magnetic tape 1. A plurality of regions 11 each of which is interposed between two servo bands are data bands. The servo pattern is a magnetized region and is formed by magnetizing a specific region of the magnetic layer by the servo write head. The region magnetized by the servo write head (a position where a servo pattern is formed) is determined by standards. For example, in an LTO Ultrium format tape which is based on a local standard, a plurality of servo patterns tilted in a tape width direction as shown in FIG. 2 are formed on the servo band, in a case of manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with the servo patterns A1 to A5 and the B burst is configured with the servo patterns B1 to B5. Meanwhile, the servo sub-frame 2 is configured with a C burst (in FIG. 2, reference numeral C) and a D burst (in FIG. 2, reference numeral D). The C burst is configured with the servo patterns C1 to C4 and the D burst is configured with the servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for explaining. However, in practice, in the magnetic layer of the magnetic tape in which the head tracking servo in the timing-based servo system is performed, a plurality of servo frames are disposed in each servo band in a running direction. In FIG. 2, an arrow shows the running direction. For example, the LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the drive.

In the head tracking servo in the timing-based servo system, the position of the servo head is recognized based on an interval of time in a case where the servo head has read the two servo patterns (reproduced servo signals) having different shapes and an interval of time in a case where the servo head has read two servo patterns having the same shapes. The time interval is normally obtained as a time interval of a peak of a reproduced waveform of the servo signal. For example, in the aspect shown in FIG. 2, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time in a case where the servo head has read the two servo patterns having different shapes is, for example, an interval between the time in a case where any servo pattern of the A burst is read and the time in a case where any servo pattern of the B burst is read. An interval of the time in a case where the servo head has read the two servo patterns having the same shapes, for example, an interval between the time in a case where any servo pattern of the A burst is read and the time in a case where any servo pattern of the C burst is read. The head tracking servo in the timing-based servo system is a system supposing that the occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIGS. 1 and 2, but also to entire timing-based servo systems.

For details of the head tracking servo of the timing-based servo system, for example, well-known technologies such as technologies disclosed in U.S. Pat. Nos. 5,689,384A, 6,542, 325B, and 7,876,521B can be used. In addition, for the details of the head tracking servo in the amplitude-based servo system, well-known technologies disclosed in U.S. Pat. Nos. 5,426,543A and 5,898,533A can be used.

According to one aspect of the present invention, it is also possible to provide a magnetic recording and reproducing device including the magnetic recording medium manufactured by the manufacturing method, a servo head, and the magnetic head. The magnetic recording and reproducing device is generally called a drive, and is not limited to a device which performs recording and reproducing of the data information, and includes a device which only performs recording of the data information and a device which only performs reproducing of the data information.

As the magnetic head, a well-known magnetic head capable of recording the data information on a magnetic recording medium and/or reproducing the data information can be used. The recording head and the reproducing head may be one magnetic head or may be separated magnetic heads. In addition, the recording head may be the magnetic head which performs recording of the data information without performing the microwave-assisted recording, or may be the magnetic head which performs recording of the data information by the microwave-assisted recording. For the magnetic head which performs recording of data information by the microwave-assisted recording, the above description can be referred to.

As the servo head, a well-known servo head capable of reading the servo pattern formed on the magnetic layer of the magnetic recording medium can be used. At least one or two or more servo heads may be included in the magnetic recording and reproducing device. In addition, the servo pattern reading element may be included in the magnetic head including an element for recording the data information and/or an element for reproducing the data information. That is, the magnetic head and the servo head may be a single head.

As described above, according to one aspect of the present invention, it is possible to record the data information with respect to the coating type magnetic recording medium by the microwave-assisted recording. In addition, according to one aspect of the present invention, it is possible to form the servo pattern with respect to the coating type magnetic recording medium by the microwave-assisted recording.

EXAMPLES

Hereinafter, the present invention will be described in more detail based on the examples. However, the present invention is not limited to the aspect shown in the examples. In the following description, "parts" and "%" indicate "part by mass" and "% by mass" unless otherwise noted. "eq" is equivalent, and is a unit that cannot be converted to SI unit. Moreover, the following steps and the evaluations were performed in the air of 23° C.±1° C. unless otherwise noted.

In the following table, "SR" indicates the hexagonal strontium ferrite powder, "ε" indicates the ε-iron oxide powder.

The average particle size and the coefficient of variation of the particle size distribution of each ferromagnetic powder in Table 1 below are values obtained by the method described above for sample powders collected from the magnetic layer of each magnetic recording medium sample.

The coercivity Hc of each ferromagnetic powder in Table 1 is a value measured at an application magnetic field of 1194 kA/m (15 kOe) by using a vibrating sample magnetometer (manufactured by Toei Industry Co., Ltd.).

1. Manufacturing and Evaluation of Magnetic Recording Medium (Magnetic Tape) Sample Magnetic Recording Medium Sample No. 1

A magnetic recording medium (a magnetic tape) sample No. 1 was manufactured.

Manufacturing of Magnetic Recording Medium

Preparation of Ferromagnetic Powder (Hexagonal Strontium Ferrite Powder)

1623 g of $SrCO_3$, 637 g of $H_3BO_3$, 1104 g of $Fe_2O_3$, 27 g of $Al(OH)_3$, and 77 g of $BaCO_3$ were mixed with a mixer, and a raw material mixture was obtained.

The obtained raw material mixture was melted in a platinum crucible at a melting temperature of 1400° C., a metal tapping port provided on the bottom of the platinum crucible was heated while stirring the melted solution, and the melted solution was tapped in a rod shape at approximately 6 g/sec. The tapped solution was rapidly cold-rolled with a water cooling twin roller and an amorphous material was prepared.

280 g of the prepared amorphous material was put into an electric furnace, heated to 605° C. (a crystallization temperature) at a heating rate of 3.5° C./min, and kept at the same temperature for 5 hours to precipitate (crystallize) hexagonal strontium ferrite particles.

Next, the crystalline material including the hexagonal strontium ferrite particles was coarsely pulverized with a mortar, and 1000 g of zirconia beads having the particle diameter of 1 mm, and 800 ml of 1% strength acetic acid aqueous solution were added to a glass bottle, and dispersion process was performed in a paint shaker for 3 hours. Thereafter, the obtained dispersion liquid was separated from the beads and put into the stainless beaker. The dispersion liquid was placed at a liquid temperature of 100° C. for 3 hours to dissolve the glass component, precipitated with a centrifugal separator, decantation was repeated and washed, and drying was performed in a heating furnace at a furnace inner temperature of 110° C. for 6 hours, and the hexagonal strontium ferrite powder was obtained.

Formulation of Composition for Forming Magnetic Layer

Ferromagnetic powder (Hexagonal strontium ferrite powder prepared above) 100.0 parts Polyurethane resin 12.2 parts Weight-average molecular weight: 10000

Sulfonic acid group content: 0.5 meq/g

Diamond particle 1.85 parts

Average particle size: 50 nm

Carbon black (Asahi Carbon Co., Ltd. #55) 0.5 parts

Average particle size: 0.015 μm

Stearic acid 0.5 parts

Butyl stearate 2.1 parts

Methyl ethyl ketone 180.0 parts

Cyclohexanone 100.0 parts

Formulation of Composition for Forming Non-magnetic Layer

Non-magnetic powder α-iron oxide 103.0 parts

Average particle size: 0.09 μm

Brunauer-emmett-teller (BET) specific surface area: 50 $m^2/g$ pH: 7

Dibutylphthalate (DBP) oil absorption: 27 to 38 g/100 g

Surface treatment agent: $Al^2O^3$ (8% by mass)

Carbon black (Conductex SC-U manufactured by Colombian Carbon) 25.0 parts

Vinyl chloride copolymer (MR104 manufactured by Kaneka Corporation) 12.9 parts

Polyurethane resin (UR8200 manufactured by Toyobo Co., Ltd.) 5.2 parts

Phenylphosphonic acid 3.5 parts

Butyl stearate 1.1 parts

Stearic acid 2.1 parts

Methyl ethyl ketone 205.0 parts

Cyclohexanone 135.0 parts

Formulation of Composition for Forming Back Coating Layer

Non-magnetic powder α-iron oxide 80.0 parts

Average particle size: 0.15 μm

Average acicular ratio: 7

BET specific surface area: 52 $m^2/g$

Carbon black 20.0 parts

Average particle size: 20 nm

Vinyl chloride copolymer 13.0 parts

Sulfonic acid group-containing polyurethane resin 6.0 parts

Phenylphosphonic acid 3.0 parts

Cyclohexanone 155.0 parts

Methyl ethyl ketone 155.0 parts

Stearic acid 3.0 parts

Butyl stearate 3.0 parts

Butyl stearate 5.0 parts
Cyclohexanone 200.0 parts

Manufacturing of Magnetic Tape

For each of the composition for forming the magnetic layer and the composition for forming the non-magnetic layer, the various components described above were kneaded with the kneader. The zirconia beads having a particle diameter of 1.0 mm flowed, with a pump, into a horizontal sand mill filled with 65% by volume with respect to the volume of a dispersion unit, and was dispersed for 120 minutes at 2000 rpm (revolution per minute) for 120 minutes (substantially, for a residence time in the dispersion unit). Regarding the composition for forming the magnetic layer, the obtained dispersion liquid was filtered with a filter having a hole diameter of 1 μm to obtain the composition for forming the magnetic layer. Regarding the composition for forming the non-magnetic layer, the obtained dispersion liquid was filtered with a filter having a hole diameter of 1 μm after adding 6.5 parts of polyisocyanate and 7.0 parts of methyl ethyl ketone to obtain the composition for forming the non-magnetic layer.

The composition for forming the back coating layer was prepared by the following method. Each component except lubricant (stearic acid and butyl stearate), and 200.0 parts of polyisocyanate and cyclohexanone was kneaded and diluted with the open kneader, 12 passes of the dispersion process were performed using the horizontal bead mill disperser with the zirconia beads having a particle diameter of 1.0 mm under conditions of 80% by volume of bead filling percentage, 10 m/sec of a rotor tip peripheral velocity, and 2 minutes of a residence time per pass.

Thereafter, the remaining components were added to the dispersion liquid and stirred with a dissolver. The obtained dispersion liquid was filtered with a filter having a hole diameter of 1 μm to obtain the composition for forming the back coating layer.

Thereafter, the composition for forming the non-magnetic layer was applied onto one surface of the non-magnetic support made of polyethylene having a thickness of 5.0 μm such that the thickness after drying becomes 0.1 μm, and dried to obtain the non-magnetic layer.

Thereafter, the composition for forming the magnetic layer was applied onto the non-magnetic layer to form the coating layer. While the coating layer is in an undried state, the magnetic field having a magnetic field strength of 0.6 T was applied in a direction perpendicular to the surface of the coating layer and vertical alignment process was performed, and then the coating layer was dried to form the magnetic layer.

Thereafter, the composition for forming the back coating layer was applied onto the opposite surface of the non-magnetic support such that the thickness after drying becomes 0.4 μm, and dried to obtain the back coating layer.

Thereafter, a surface smoothing process (the calender processing) was performed once with the calender roll configured only with a metal roll at a calendering temperature (a surface temperature of the calender roll) of 95° C. and a linear pressure of 300 kg/cm (294 kN/m). Thereafter, the back coating layer was slit into a ½ inch (0.0127 meter) width and subjected to surface polishing to obtain the magnetic tape.

Magnetic Recording Medium Sample No. 2

A magnetic recording medium sample No. 2 was manufactured in the same manner as in the manufacturing of the magnetic recording medium sample No. 1, except that the following points were changed in a step of preparing the ferromagnetic powder.

The hexagonal strontium ferrite powder was obtained in the same manner in the above except that 1612 g of $SrCO_3$, 637 g of $H_3BO_3$, 1094 g of $Fe_2O_3$, 112 g of Al $(OH)_3$, 24 g of $BaCO_3$, 38 g of $CaCO_3$, and 234 g of $Nd_2O_5$ were weighed and mixed with the mixer to obtain a raw material mixture, and the crystallization temperature was changed to 615° C., in the step of preparing the ferromagnetic powder.

Magnetic Recording Medium Sample No. 3

A magnetic recording medium sample No. 3 was manufactured in the same manner as in the manufacturing of the magnetic recording medium sample No. 2, except that the crystallization temperature was changed to 619° C., in a step of preparing the ferromagnetic powder.

Magnetic Recording Medium Sample No. 4

A magnetic recording medium sample No. 4 was manufactured in the same manner as in the manufacturing of the magnetic recording medium sample No. 1, except that the following points were changed in a step of preparing the ferromagnetic powder.

The hexagonal strontium ferrite powder was obtained in the same manner in the above except that 1712 g of $SrCO_3$, 657 g of $H_3BO_3$, 1326 g of $Fe_2O_3$, 50 g of Al $(OH)_3$, 242 g of $CaCO_3$, 13 g of ZnO, and 21 g of $Nb_2O_5$ were weighed and mixed with the mixer to obtain a raw material mixture, and the crystallization temperature was changed to 648° C., in the step of preparing the ferromagnetic powder.

Magnetic Recording Medium Sample No. 5

A magnetic recording medium sample No. 5 was manufactured in the same manner as in the manufacturing of the magnetic recording medium sample No. 4, except that the crystallization temperature was changed to 653° C., in a step of preparing the ferromagnetic powder.

Magnetic Recording Medium Sample No. 6

A magnetic recording medium sample No. 6 was manufactured in the same manner as in the manufacturing of the magnetic recording medium sample No. 1, except that the following points were changed in a step of preparing the ferromagnetic powder.

The hexagonal strontium ferrite powder was obtained in the same manner except that the slurry washed by repeating decantation was diluted with 10% strength acetic acid aqueous solution, subjected to an ultrasonic dispersion process, re-dispersed, and dried in a heating furnace at a furnace inner temperature of 110° C. for 6 hours after a step of removing supernatant by performing centrifugal separation was repeated three times, in the step of manufacturing the ferromagnetic powder.

Magnetic Recording Medium Sample No. 7

A magnetic recording medium sample No. 7 was manufactured in the same manner as in the manufacturing of the magnetic recording medium sample No. 6, except that the step of removing the supernatant was changed to be repeated twice, in a step of preparing the ferromagnetic powder.

Magnetic Recording Medium Sample No. 8

A magnetic recording medium sample No. 8 was manufactured in the same manner in the manufacturing of the magnetic recording medium sample No. 1 except that as 100.0 parts of the ferromagnetic powder used in the magnetic layer, the ferromagnetic powder was used by mixing 90.0 parts of the ferromagnetic powder prepared in the same manner as the ferromagnetic powder used in the magnetic recording medium sample No. 1 and 10.0 parts of ferromagnetic powder prepared in the same manner as the ferromagnetic powder used in the magnetic recording medium sample No. 5.

Magnetic Recording Medium Sample No. 9

A magnetic recording medium sample No. 9 was manufactured in the same manner in the manufacturing of the magnetic recording medium sample No. 1 except that as 100.0 parts of the ferromagnetic powder used in the magnetic layer, the ferromagnetic powder was used by mixing 80.0 parts of the ferromagnetic powder prepared in the same manner as the ferromagnetic powder used in the magnetic recording medium sample No. 1 and 20.0 parts of the ferromagnetic powder prepared in the same manner as the ferromagnetic powder used in the magnetic recording medium sample No. 5.

Magnetic Recording Medium Samples No. 10 to 13

Magnetic recording medium samples No. 10 to 13 were manufactured in the same manner as in the manufacturing of the magnetic recording medium sample No. 1, except that the amount of application of the composition for forming the magnetic layer at the time of the magnetic layer formation was changed.

Magnetic Recording Medium Sample No. 14

A magnetic recording medium sample No. 14 was manufactured in the same manner as in the manufacturing of the magnetic recording medium sample No. 1 except that the calendering temperature (the surface temperature of the calender roll) in the calender processing was changed to 100° C., and the number of the calender processing was changed to four.

Magnetic Recording Medium Sample No. 15

A magnetic recording medium sample No. 15 was manufactured in the same manner as in the manufacturing of the magnetic recording medium sample No. 14 except that the number of the calender processing was changed to two.

Magnetic Recording Medium Sample No. 16

A magnetic recording medium sample No. 16 was manufactured in the same manner as in the manufacturing of the magnetic recording medium sample No. 1 except that the calendering temperature (the surface temperature of the calender roll) in the calender processing was changed to 90° C.

Magnetic Recording Medium Sample No. 17

A magnetic recording medium sample No. 17 was manufactured in the same manner as in the manufacturing of the magnetic recording medium sample No. 1 except that the calendering temperature (the surface temperature of the calender roll) in the calender processing was changed to 95° C., and the surface polishing was not performed after slitting.

Magnetic Recording Medium Sample No. 18

The composition 1 for forming the magnetic recording layer was prepared in the same manner as the formulation and the method of manufacturing the magnetic recording medium sample No. 1, by using the ferromagnetic powder (the ε-iron oxide powder) prepared by the following method, as the ferromagnetic powder. The composition 1 for forming the magnetic layer prepared as described above was diluted with the mixed solvent of methyl ethyl ketone and cyclohexanone having the same mixing ratio (mass basis) as that for preparing the composition 1 for forming the magnetic layer, subjected to the centrifugal separation (hereinafter, referred to as the "centrifugal separation at the time of preparing the composition for forming the magnetic layer") once, and subjected to the step of removing the supernatant (hereinafter, referred to as the "supernatant removal step at the time of preparing the composition for forming the magnetic layer") once, and thus, the slurry was obtained. The obtained slurry was diluted with the mixed solvent of methyl ethyl ketone and cyclohexanone having the same mixing ratio (mass basis) as that for preparing the composition 1 for forming the magnetic layer so as to have the same solid content concentration as that of the composition 1 for forming the magnetic layer before dilution, and thus the composition 2 for forming the magnetic layer was obtained. A magnetic recording medium sample No. 18 was prepared as described above in the same manner as in the manufacturing of the magnetic recording medium sample No. 1 except that the magnetic layer was formed by using the obtained composition 2 for forming the magnetic layer.

Preparation of Ferromagnetic Powder (ε-Iron Oxide Powder)

4.0 g of 25% by mass ammonia aqueous solution was added to a material obtained by dissolving 8.5 g of iron (III) nitrate nonahydrate, 1.1 g of gallium (III) nitrate octahydrate, 150 mg of cobalt (II) nitrate hexahydrate, and 118 mg of titanium (IV) sulfate in 90 g of pure water, while stirring by using a magnetic stirrer, in an atmosphere under the conditions of an atmosphere temperature of 25° C., and the mixture was stirred for 2 hours. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in the heating furnace at a furnace inner temperature of 80° C.

800 g of pure water was added to the dried powder and the powder was dispersed in water again, and thus the dispersion liquid was obtained. The obtained dispersion liquid was heated to a liquid temperature of 50° C., and 40 g of 25% by mass ammonia aqueous solution was added dropwise while stirring. The stirring was performed for 1 hour while holding the liquid temperature of 50° C., 14 ml of tetraethoxysilane (TEOS) was added dropwise and stirred for 24 hours, and a reaction solution was obtained. 50 g of ammonium sulfate was added to the obtained reaction solution, the precipitated powder was collected by centrifugal separation, washed with pure water, and dried in the heating furnace at a furnace inner temperature of 80° C. for 24 hours, and a precursor of ferromagnetic powder was obtained.

The heating furnace at a furnace inner temperature of 1004° C. (a firing temperature) was filled with the obtained precursor of the ferromagnetic powder in the atmosphere and subjected to thermal treatment for 4 hours.

The thermal-treated precursor of the ferromagnetic powder was put into sodium hydroxide (NaOH) aqueous solution having a concentration of 4 mol/L, the liquid temperature was held at 70° C., stirring was performed for 24 hours, and accordingly, a silicon acid compound which is an impurity was removed from the thermal-treated precursor of the ferromagnetic powder.

After that, by the centrifugal separation, the ferromagnetic powder obtained by removing the silicon acid compound was collected and washed with pure water, and the ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide ($\varepsilon$-$Ga_{0.2}Co_{0.02}Ti_{0.02}Fe_{1.76}O_3$) was obtained. In addition, the powder X-ray diffraction (XRD) was performed, and it was confirmed that the obtained ferromagnetic powder has a crystal structure of a single phase which is an ε phase not including a crystal structure of an α phase and a γ phase from the peak of the XRD pattern.

Magnetic Recording Medium Sample No. 19

A magnetic recording medium sample No. 19 was manufactured in the same manner as in the preparation of the magnetic recording medium sample No. 18 except that in a step of preparing the ferromagnetic powder, an amount of iron (III) nitrate nonahydrate was changed to 9.1 g, cobalt (II) nitrate hexahydrate and titanium (IV) sulfate were not added, the firing temperature was changed to 974° C., and centrifugal separation was not performed at the time of preparing the composition for forming the magnetic layer.

Magnetic Recording Medium Sample No. 20

A magnetic recording medium sample No. 20 was manufactured in the same manner as in the manufacturing of the magnetic recording medium sample No. 19, except that the firing temperature was changed to 978° C., in a step of preparing the ferromagnetic powder.

Magnetic Recording Medium Sample No. 21

A magnetic recording medium sample No. 21 was manufactured in the same manner as in the preparation of the magnetic recording medium sample No. 19 except that in a step of preparing the ferromagnetic powder, an amount of iron (III) nitrate nonahydrate was changed to 9.0 g, an amount of gallium (III) nitrate octahydrate was changed to 1.2 g, the firing temperature was changed to 1014° C., and centrifugal separation was not performed at the time of preparing the composition for forming the magnetic layer.

Magnetic Recording Medium Sample No. 22

A magnetic recording medium sample No. 22 was manufactured in the same manner as in the manufacturing of the magnetic recording medium sample No. 21, except that the firing temperature was changed to 1017° C., in a step of preparing the ferromagnetic powder.

Magnetic Recording Medium Sample No. 23

A magnetic recording medium sample No. 23 was manufactured in the same manner as in the manufacturing of the magnetic recording medium sample No. 18, except that centrifugal separation at the time of preparing the composition for forming the magnetic layer is performed three times.

Magnetic Recording Medium Sample No. 24

A magnetic recording medium sample No. 24 was manufactured in the same manner as in the manufacturing of the magnetic recording medium sample No. 18, except that centrifugal separation at the time of preparing the composition for forming the magnetic layer is performed twice.

Magnetic Recording Medium Sample No. 25

A magnetic recording medium sample No. 25 was manufactured in the same manner in the manufacturing of the magnetic recording medium sample No. 18 except that as 100.0 parts of the ferromagnetic powder used in the magnetic layer, the ferromagnetic powder was used by mixing 90.0 parts of the ferromagnetic powder prepared in the same manner as the ferromagnetic powder used in the magnetic recording medium sample No. 18 and 10.0 parts of the ferromagnetic powder prepared in the same manner as the ferromagnetic powder used in the magnetic recording medium sample No. 22.

Magnetic Recording Medium Sample No. 26

A magnetic recording medium sample No. 26 was manufactured in the same manner in the manufacturing of the magnetic recording medium sample No. 18 except that as 100.0 parts of the ferromagnetic powder used in the magnetic layer, the ferromagnetic powder was used by mixing 80.0 parts of the ferromagnetic powder prepared in the same manner as the ferromagnetic powder used in the magnetic recording medium sample No. 18 and 20.0 parts of the ferromagnetic powder prepared in the same manner as the ferromagnetic powder used in the magnetic recording medium sample No. 22.

Magnetic Recording Medium Samples No. 27 to 30

Magnetic recording medium samples No. 27 to 30 were manufactured in the same manner as in the manufacturing of the magnetic recording medium sample No. 18, except that the amount of application of the composition for forming the magnetic layer at the time of the magnetic layer formation was changed.

Magnetic Recording Medium Sample No. 31

A magnetic recording medium sample No. 31 was manufactured in the same manner as in the manufacturing of the magnetic recording medium sample No. 18 except that the calendering temperature (the surface temperature of the calender roll) in the calender processing was changed to 100° C., and the number of the calender processing was changed to four.

Magnetic Recording Medium Sample No. 32

A magnetic recording medium sample No. 32 was manufactured in the same manner as in the manufacturing of the magnetic recording medium sample No. 31 except that the number of the calender processing was changed to two.

Magnetic Recording Medium Sample No. 33

A magnetic recording medium sample No. 33 was manufactured in the same manner as in the manufacturing of the magnetic recording medium sample No. 18 except that the calendering temperature (the surface temperature of the calender roll) in the calender processing was changed to 90° C.

Magnetic Recording Medium Sample No. 34

A magnetic recording medium sample No. 34 was manufactured in the same manner as in the manufacturing of the magnetic recording medium sample No. 18 except that the calendering temperature (the surface temperature of the calender roll) in the calender processing was changed to 95° C., and the surface polishing was not performed after slitting.

Magnetic Recording Medium Sample No. 35

A magnetic recording medium sample No. 35 was manufactured in the same manner as in the manufacturing of the magnetic recording medium sample No. 6 except that the calendering temperature (the surface temperature of the calender roll) in the calender processing was changed to 100° C., and the number of the calender processing was changed to two.

Magnetic Recording Medium Sample No. 36

A magnetic recording medium sample No. 36 was manufactured in the same manner as in the manufacturing of the magnetic recording medium sample No. 23 except that the calendering temperature (the surface temperature of the calender roll) in the calender processing was changed to 100° C., and the number of the calender processing was changed to two.

Magnetic Recording Medium Sample No. 37

A magnetic recording medium sample No. 37 was manufactured in the same manner as in the manufacturing of the magnetic recording medium sample No. 7, except that the step of removing the supernatant liquid was changed to be repeated five times, in a step of preparing the ferromagnetic powder.

Magnetic Recording Medium Sample No. 38

A magnetic recording medium sample No. 38 was manufactured in the same manner as in the manufacturing the magnetic recording medium sample No. 24 except that the number of the supernatant removal step at the time of preparing the composition for forming the magnetic layer was changed to five times.

Evaluation of Magnetic Recording Medium (1) Thickness and Thickness Variation of Magnetic Layer The thickness and the thickness variation of the magnetic layer of each manufactured magnetic tape were obtained by the following methods.

(i) Manufacturing of Cross-sectional Observation Sample

According to a method disclosed in paragraphs 0193 to 0194 of JP2016-177851A, a cross-sectional observation sample including the entire region in the thickness direction from the magnetic layer side surface to the back coating layer side surface of the magnetic tape was manufactured.

(ii) Thickness Measurement

The manufactured sample was observed by the STEM, and a STEM image was captured. The STEM image is a high-angle annular dark field (STEM-HAADF) image captured at an acceleration voltage of 300 kV and an imaging magnification of 450000 times, and was captured so that the entire area in the thickness direction from the magnetic layer side surface to the back coating layer side surface of the magnetic tape was included in one image. In the STEM image obtained as described above, a straight line connecting both ends of a line segment representing the magnetic layer surface was determined as a reference line representing the magnetic layer side surface of the magnetic tape. The straight line connecting both ends of the line segment is, for example, a straight line connecting an intersection of the left side of the STEM image (the shape is rectangle or square) and the line segment, and an intersection of the right side of the STEM image and the line segment, in a case where the STEM image was captured such that the magnetic layer side of the cross-sectional observation sample was positioned on the upper side of the image and the back coating layer side was positioned on the lower side. Similarly, a reference line representing an interface between the magnetic layer and the non-magnetic layer.

The thickness of the magnetic layer was obtained as the arithmetical mean of the thickness calculated as the shortest distance from the reference line representing the magnetic layer side surface of the magnetic tape to the reference line representing the interface of the magnetic layer and the non-magnetic layer for randomly extracted ten locations. The thickness variation was obtained as the "maximum value−minimum value" of the thickness obtained as described above.

(2) Evaluation of Microwave-Assisted Recording Suitability

For each magnetic recording medium sample, the natural ferromagnetic resonance frequency of the magnetic layer was obtained by the following methods.

A $SiO_2$ film having a thickness of 100 nm was formed on a Si substrate having a thickness of 0.5 μm by a sputtering method. Then, by a lift-off technology, a Ti film having a thickness of 5 nm and a Au film having a thickness of 300 nm were laminated in this order, and the planar waveguide was formed. A sample piece of width 7 mm×length 5 mm was cut out from the magnetic tape sample manufactured above, the sample piece was placed on the planar waveguide such that the magnetic layer surface was in close contact with the surface of the Au film of the planar waveguide. Thus, the magnetic recording medium sample with the planar waveguide was manufactured.

Using the magnetic recording medium sample with the planar waveguide manufactured as described above, the natural ferromagnetic resonance frequency of the magnetic layer of each magnetic recording medium sample was measured by using MS4647B manufactured by Anritsu Corporation as a vector network analyzer, and by using a non-magnetic member as a cable and a prober. The absorption peak frequency which will be described below was also measured in the same manner. The natural ferromagnetic resonance frequency was obtained as an absorption peak frequency of the magnetic layer measured by the vector network analyzer, in a case where the application magnetic field becomes zero, after saturation of magnetization of the magnetic layer by applying 1034.8 kA/m (13 kOe) of the magnetic field in a positive direction, in a case where the silicon substrate side of the magnetic layer in the thickness direction is set as a negative direction and the other side is set as the positive direction.

Using the magnetic recording medium sample with the planar waveguide, the microwave-assisted recording suitability of each magnetic recording medium sample was evaluated by the following methods and ranked according to the following evaluation criteria.

Evaluation Method

Magnetization of the magnetic layer of the magnetic recording medium sample was saturated by applying the magnetic field in the positive direction, and then the external magnetic field (the recording magnetic field) having the magnetic field strength of 159.2 kA/m (2 kOe) was applied in the negative direction without applying the microwave magnetic field. In a case where magnetization reversal occurs due to the application of the external magnetic field, the measured absorption peak frequency becomes higher than the natural ferromagnetic resonance frequency of the magnetic layer.

For the magnetic recording medium sample in which magnetization reversal did not occur due to the application of the external magnetic field, the following evaluation is further performed.

In a state where magnetization of the magnetic layer of the magnetic recording medium sample was saturated by applying the magnetic field in the positive direction, and the external magnetic field (the recording magnetic field) having the magnetic field strength of 159.2 kA/m (2 kOe) was applied in the negative direction, the microwave magnetic field having the same frequency as the natural ferromagnetic resonance frequency of the magnetic recording medium sample was applied through the amplifier for a predetermined time, and thereafter, the absorption peak frequency of the magnetic layer was measured. In a case where magnetization reversal occurs by being assisted by the application of the microwave magnetic field, the measured absorption peak frequency becomes higher than the natural ferromagnetic resonance frequency of the magnetic layer. In this case, it can be determined that microwave-assisted recording is possible. For the magnetic recording medium sample determined to be capable of microwave-assisted recording, the peak intensity and the peak shape of the ferromagnetic resonance peak after magnetization reversal is observed, and the microwave-assisted recording suitability is further evaluated.

In the example described above, the recording magnetic field is applied in the thickness direction of the magnetic layer, and thus, the recording system is the perpendicular recording.

Evaluation Criteria

6: Magnetization reversal is confirmed at microwave magnetic field application time of 50 ns or shorter, and microwave-assisted recording can be performed. The peak intensity of the ferromagnetic resonance peak after magnetization reversal is strong, and the peak shape thereof is sharp (the half width of the peak is narrow).

5: The magnetization reversal is confirmed for microwave magnetic field application time of 50 ns or shorter, and microwave-assisted recording can be performed. The peak shape of the ferromagnetic resonance peak after magnetization reversal is sharp (the half width of the peak is narrow).

resonance peak after magnetization reversal is wider than the evaluation criteria 4 to 6.

2: Clear magnetization reversal behavior is not confirmed even the microwave magnetic field is applied for 150 ns.

1: Magnetization reversal can be performed only with the external magnetic field.

The results are shown in Table 1.

TABLE 1

| Example/Comparative Example | Magnetic recording medium Sample No. | Ferromagnetic powder | | | | Magnetic layer | | Evaluation result |
|---|---|---|---|---|---|---|---|---|
| | | Type | Average particle size (nm) | Coefficient of variation in particle size (%) | Coercivity Hc (kA/m) | Thickness variation (nm) | Thickness (nm) | |
| Example | 1 | SR | 15 | 26 | 2314 | 7.1 | 50.8 | 4 |
| Example | 2 | SR | 9 | 20 | 2151 | 8.2 | 52.8 | 4 |
| Example | 3 | SR | 12 | 22 | 2245 | 7.4 | 51.9 | 4 |
| Example | 4 | SR | 19 | 30 | 2354 | 7.3 | 51.7 | 4 |
| Comparative Example | 5 | SR | 21 | 31 | 2463 | 8.2 | 51.0 | 2 |
| Example | 6 | SR | 15 | 11 | 2447 | 7.2 | 52.4 | 5 |
| Example | 7 | SR | 14 | 21 | 2415 | 7.7 | 53.1 | 4 |
| Example | 8 | SR | 15 | 34 | 2377 | 7.4 | 51.8 | 3 |
| Comparative Example | 9 | SR | 15 | 37 | 2359 | 7.9 | 54.7 | 2 |
| Comparative Example | 10 | SR | 15 | 26 | 2281 | 4.1 | 23.3 | 2 |
| Example | 11 | SR | 15 | 26 | 2309 | 4.4 | 27.1 | 4 |
| Example | 12 | SR | 15 | 26 | 2413 | 10.0 | 95.4 | 4 |
| Comparative Example | 13 | SR | 15 | 26 | 2436 | 9.7 | 107.1 | 2 |
| Comparative Example | 14 | SR | 15 | 26 | 2346 | 0.8 | 51.6 | 2 |
| Example | 15 | SR | 15 | 26 | 2338 | 2.4 | 52.4 | 5 |
| Example | 16 | SR | 15 | 26 | 2365 | 11.3 | 55.1 | 3 |
| Comparative Example | 17 | SR | 15 | 26 | 2331 | 13.4 | 54.0 | 2 |
| Example | 18 | ε | 13 | 28 | 2749 | 6.9 | 51.2 | 4 |
| Comparative Example | 19 | ε | 4 | 20 | 1799 | 7.8 | 52.7 | 1 |
| Example | 20 | ε | 7 | 22 | 2241 | 6.8 | 51.9 | 4 |
| Example | 21 | ε | 18 | 30 | 2897 | 7.1 | 51.8 | 4 |
| Comparative Example | 22 | ε | 21 | 31 | 2916 | 8.0 | 50.9 | 2 |
| Example | 23 | ε | 13 | 14 | 2784 | 6.8 | 51.7 | 5 |
| Example | 24 | ε | 13 | 23 | 2796 | 7.7 | 52.8 | 4 |
| Example | 25 | ε | 14 | 34 | 3007 | 7.3 | 51.6 | 3 |
| Comparative Example | 26 | ε | 14 | 39 | 3041 | 8.1 | 54.9 | 2 |
| Comparative Example | 27 | ε | 13 | 28 | 2711 | 3.9 | 22.8 | 2 |
| Example | 28 | ε | 13 | 28 | 2734 | 4.7 | 27.6 | 4 |
| Example | 29 | ε | 13 | 28 | 2869 | 8.8 | 95.4 | 4 |
| Comparative Example | 30 | ε | 13 | 28 | 2914 | 9.8 | 106.6 | 2 |
| Comparative Example | 31 | ε | 13 | 28 | 2758 | 0.9 | 51.7 | 2 |
| Example | 32 | ε | 13 | 28 | 2763 | 3.3 | 51.8 | 5 |
| Example | 33 | ε | 13 | 28 | 2728 | 10.0 | 54.6 | 3 |
| Comparative Example | 34 | ε | 13 | 28 | 2764 | 13.8 | 53.6 | 2 |
| Example | 35 | SR | 15 | 11 | 2374 | 3.1 | 51.8 | 6 |
| Example | 36 | ε | 13 | 14 | 2843 | 2.9 | 52.2 | 6 |
| Example | 37 | SR | 15 | 9 | 2381 | 7.4 | 52.1 | 6 |
| Example | 38 | ε | 13 | 9 | 2817 | 7.3 | 51.8 | 6 |

The peak intensity of the ferromagnetic resonance peak after magnetization reversal is weaker than the evaluation criterion 6.

4: The magnetization reversal is confirmed at microwave magnetic field application time of longer than 50 ns and 150 ns or shorter, and microwave-assisted recording can be performed. The peak shape of the ferromagnetic resonance peak after magnetization reversal is sharp (the half width of the peak is narrow). The peak intensity of the ferromagnetic resonance peak after magnetization reversal is weaker than the evaluation criterion 6.

3: The magnetization reversal is confirmed at microwave magnetic field application time of longer than 50 ns and 150 ns or shorter, and microwave-assisted recording can be performed. The peak intensity of the ferromagnetic resonance peak after magnetization reversal is weaker than the evaluation criterion 6. The half width of the ferromagnetic Based on the results shown in Table 1, the magnetic recording medium samples in Examples can perform microwave-assisted recording, and are easily assisted in magnetization reversal by applying the microwave magnetic field, and superior in microwave-assisted recording suitability.

(3) Ten-point Average Roughness Rz of Surface of Magnetic Layer

For the magnetic recording medium sample of Example in Table 1, the measurement area of 40 μm×40 μm in the magnetic layer surface of the magnetic tape was measured by using the AFM (Nanoscope 4 manufactured by Veeco Instruments Inc.) in a tapping mode, and the ten-point average roughness Rz was obtained. As the probe, RTESP-300 manufactured by BRUKER was used, and a scanning speed (a probe moving speed) was 40 μm/sec, and the resolution was 512 pixels×512 pixels.

In Table 2, for the magnetic recording medium samples of Examples in Table 1, the natural ferromagnetic resonance frequency of the magnetic layer measured in above (2) and the ten-point average roughness Rz measured in above (3) are shown.

TABLE 2

| Magnetic recording medium sample No. | Natural ferromagnetic resonance frequency (GHz) | Rz (nm) |
|---|---|---|
| 1 | 40 | 35 |
| 2 | 38 | 36 |
| 3 | 39 | 35 |
| 4 | 41 | 34 |
| 6 | 40 | 33 |
| 7 | 40 | 34 |
| 8 | 40 | 34 |
| 11 | 40 | 24 |
| 12 | 40 | 37 |
| 15 | 40 | 21 |
| 16 | 40 | 41 |
| 18 | 53 | 35 |
| 20 | 49 | 35 |
| 21 | 55 | 34 |
| 23 | 52 | 33 |
| 24 | 52 | 34 |
| 25 | 54 | 34 |
| 28 | 53 | 24 |
| 29 | 53 | 37 |
| 32 | 53 | 21 |
| 33 | 53 | 41 |
| 35 | 40 | 30 |
| 36 | 52 | 29 |
| 37 | 40 | 34 |
| 38 | 52 | 34 |

2. Multiple Recording Test

The magnetic recording medium sample with the planar waveguide (hereinafter, referred to as a "magnetic recording medium sample No. 39") was manufactured in the same manner as in the manufacturing the magnetic recording medium sample No. 36 except that 50.0 parts of 100.0 parts of the ferromagnetic powder (the ε-iron oxide powder) was replaced by 50.0 parts of the same ferromagnetic powder (the hexagonal strontium ferrite powder) as that of the magnetic recording medium sample No. 35.

For the magnetic recording medium sample No. 39, in a state where the magnetization of the magnetic layer was saturated by applying the magnetic field in the positive direction and the external magnetic field (recording magnetic field) having magnetic field strength of 159.2 kA/m (2 kOe) was applied in the negative direction, the microwave magnetic field at a frequency of 40 GHz was applied through the amplifier for 50 ns. After that, in a case where the absorption peak frequency of the magnetic layer was measured, the absorption peak frequency was confirmed in the vicinity of the frequencies of 44.3 GHz and 52 GHz. It is considered that the absorption peak frequency in the vicinity of 44.3 GHz is an absorption peak frequency in which the natural ferromagnetic resonance frequency (40 GHz) derived from the hexagonal strontium ferrite powder contained in the magnetic layer is changed, and the absorption peak frequency in the vicinity of 52 GHz is the natural ferromagnetic resonance frequency (52 GHz) derived from the ε-iron oxide powder contained in the magnetic layer. From this, it is confirmed that the hexagonal strontium ferrite powder of the magnetic layer was caused to selectively perform magnetization reversal by applying the microwave magnetic field, that is, the information was selectively recorded in the hexagonal strontium ferrite powder in the magnetic layer containing the hexagonal strontium ferrite powder and the ε-iron oxide powder. In addition, it is possible to cause the ε-iron oxide powder to selectively perform magnetization reversal by assisting the magnetization reversal by applying the microwave magnetic field at a frequency different from the frequency of the microwave magnetic field to the magnetic recording medium sample. In a case where ε-iron oxide powder is cased to selectively perform magnetization reversal, the information is recorded by applying the external magnetic field (the recording magnetic field) which is different from that in a case of causing the hexagonal strontium ferrite powder to selectively perform the magnetization reversal, and thus, different information items can be recorded on the same single magnetic layer.

As described above, it was found that multiple recording can be performed on the same single magnetic layer by the microwave-assisted recording. Thus, it is possible to perform the multiple recording of different data information items. By setting at least one information item subjected to the multiple recording as described above as the head tracking servo information, that is, by forming the servo pattern with the shape and the disposition determined by the standard, it is possible to manufacture the magnetic recording medium having the servo pattern formed by the microwave-assisted recording on the magnetic layer.

In the above, an example in which microwave-assisted recording is performed in the non-contact type magnetic recording and reproducing system is described. According to one aspect of the present invention, as described above, microwave-assisted recording can be performed in the contact sliding type magnetic recording and reproducing system in which the magnetic layer surface and the magnetic head come into contact with each other and slide. For example, by using the magnetic head incorporating the spin torque oscillator together with the recording element for performing recording of the data information, it is possible to cause magnetization reversal (that is, to record the data information) by assisting magnetization reversal by applying the microwave magnetic field by the spin torque oscillator in a case where the recording magnetic field corresponding to information to be recorded is applied by the recording element. For example, microwave-assisted recording can be performed while running the magnetic tape in the magnetic recording device.

One aspect of the present invention is effective in the technical fields of magnetic recording medium for high-density recording.

What is claimed is:

1. A magnetic recording medium for microwave-assisted recording, comprising:
    a non-magnetic support; and
    a magnetic layer containing a ferromagnetic powder and a binding agent,
    wherein the ferromagnetic powder has an average particle size of 7 nm to 19 nm, and a coefficient of variation in a particle size distribution of 9% to 34%, and
    the magnetic layer has a thickness of 27.1 nm to 95.4 nm, and a thickness variation of 2.4 nm to 11.3 nm.

2. The magnetic recording medium for microwave-assisted recording according to claim 1,
    wherein the ferromagnetic powder includes a hexagonal strontium ferrite powder.

3. The magnetic recording medium for microwave-assisted recording according to claim 1,
    wherein the ferromagnetic powder includes an ε-iron oxide powder.

4. The magnetic recording medium for microwave-assisted recording according to claim 1, wherein the magnetic layer exhibits a natural ferromagnetic resonance frequency of 30 GHz to 60 GHz.

5. The magnetic recording medium for microwave-assisted recording according to claim 2,
wherein the magnetic layer exhibits a natural ferromagnetic resonance frequency of 30 GHz to 60 GHz.

6. The magnetic recording medium for microwave-assisted recording according to claim 3,
wherein the magnetic layer exhibits a natural ferromagnetic resonance frequency of 30 GHz to 60 GHz.

7. The magnetic recording medium for microwave-assisted recording according to claim 1,
wherein a ten-point average roughness Rz of a surface of the magnetic layer is 40 nm or less.

8. A magnetic recording device comprising:
a magnetic recording medium; and
a magnetic head for microwave-assisted recording,
wherein the magnetic recording medium has a non-magnetic support, and a magnetic layer containing a ferromagnetic powder and a binding agent,
the ferromagnetic powder has an average particle size of 7 nm to 19 nm, and a coefficient of variation of a particle size distribution of 9% to 34%, and
the magnetic layer has a thickness of 27.1 nm to 95.4 nm, and a thickness variation of 2.4 nm to 11.3 nm.

9. The magnetic recording device according to claim 8,
wherein the ferromagnetic powder includes a hexagonal strontium ferrite powder.

10. The magnetic recording device according to claim 8,
wherein the ferromagnetic powder includes an ε-iron oxide powder.

11. The magnetic recording device according to claim 8,
wherein the magnetic layer exhibits a natural ferromagnetic resonance frequency of 30 GHz to 60 GHz.

12. The magnetic recording device according to claim 9,
wherein the magnetic layer exhibits a natural ferromagnetic resonance frequency of 30 GHz to 60 GHz.

13. The magnetic recording device according to claim 10,
wherein the magnetic layer exhibits a natural ferromagnetic resonance frequency of 30 GHz to 60 GHz.

14. The magnetic recording device according to claim 8,
wherein a ten-point average roughness Rz of a surface of the magnetic layer is 40 nm or less.

15. A manufacturing method of a magnetic recording medium having a servo pattern on a magnetic layer, the method comprising:
forming a servo pattern on a magnetic layer of a magnetic recording medium by microwave-assisted recording,
wherein the magnetic recording medium has a non-magnetic support, and a magnetic layer containing a ferromagnetic powder and a binding agent,
the ferromagnetic powder has an average particle size of 7 nm to 19 nm, and a coefficient of variation of a particle size distribution of 9% to 34%, and
the magnetic layer has a thickness of 27.1 nm to 95.4 nm, and a thickness variation of 2.4 nm to 11.3 nm.

16. The manufacturing method of a magnetic recording medium according to claim 15,
wherein the ferromagnetic powder includes a hexagonal strontium ferrite powder.

17. The manufacturing method of a magnetic recording medium according to claim 15,
wherein the ferromagnetic powder includes an ε-iron oxide powder.

18. The manufacturing method of a magnetic recording medium according to claim 15,
wherein the magnetic layer exhibits a natural ferromagnetic resonance frequency of 30 GHz to 60 GHz.

19. The manufacturing method of a magnetic recording medium according to claim 15,
wherein a ten-point average roughness Rz of a surface of the magnetic layer is 40 nm or less.

\* \* \* \* \*